United States Patent [19]
Epler et al.

[11] Patent Number: 5,825,867
[45] Date of Patent: Oct. 20, 1998

[54] ENHANCED CALL WAITING

[75] Inventors: Frederick A. Epler; Robert M. Fuller, both of Issaquah; Daniel R. Kranzler, Bellevue; John T. Blanchard, Seattle, all of Wash.

[73] Assignee: Aspect Telecommunications Corporation, San Jose, Calif.

[21] Appl. No.: 210,347

[22] Filed: Mar. 18, 1994

Related U.S. Application Data

[63] Continuation-in-part of Ser. No. 480,242, Feb. 15, 1990, Pat. No. 5,375,161, which is a continuation-in-part of Ser. No. 439,601, Nov. 21, 1989, abandoned, which is a continuation-in-part of Ser. No. 841,931, Mar. 20, 1986, Pat. No. 4,893,335, which is a continuation-in-part of Ser. No. 650,821, Sep. 14, 1984, abandoned.

[51] Int. Cl.[6] .............................. H04M 3/42; H04M 1/57; H04M 3/50; H04M 3/58
[52] U.S. Cl. .............................. 379/215; 379/88; 379/89; 379/142; 379/197; 379/202; 379/212; 379/214; 379/246
[58] Field of Search ..................... 379/127, 142, 379/67, 88, 89, 188, 189, 196, 197, 198, 199, 200, 201, 210, 211, 214, 215, 246, 97, 93.26, 202, 203, 204, 205, 206, 212

[56] References Cited

U.S. PATENT DOCUMENTS

| | | | |
|---|---|---|---|
| 3,784,721 | 1/1974 | Kilby | 379/201 X |
| 4,054,756 | 10/1977 | Comella et al. | 379/207 X |
| 4,150,255 | 4/1979 | Theis et al. | 379/265 X |

(List continued on next page.)

FOREIGN PATENT DOCUMENTS

| | | |
|---|---|---|
| 0046623 | 3/1982 | European Pat. Off. . |
| 0152908 | 8/1985 | European Pat. Off. . |
| 0216381 | 4/1987 | European Pat. Off. . |
| 0216515 | 4/1987 | European Pat. Off. . |
| 0330441 | 8/1989 | European Pat. Off. . |
| 2541020 | 8/1984 | France . |
| 2929961 | 2/1981 | Germany . |
| 3411206 | 10/1985 | Germany . |
| 2198910 | 6/1988 | United Kingdom . |
| 8304451 | 12/1983 | WIPO . |

OTHER PUBLICATIONS (NEC Corp.) Patent Abstracts of Japan, vol. 13, No. 435.
(NEC Corp.) Patent Abstracts of Japan, vol. 12, No. 414.
(Fujitsu Ltd.) Patent Abstracts of Japan, vol. 5, No. 70.
(Fujitsu KK) Patent Abstracts of Japan, vol. 7, No. 288.
IBM Technical Disclosure Bulletin vol. 26, No. 5, D. Zeheb "Secretarial Branch Exchange".

*Primary Examiner*—Harry S. Hong
*Attorney, Agent, or Firm*—Ladas & Parry

[57] ABSTRACT

A method of and apparatus for providing telecommunication services to a user. When the user is engaged in a first telephone call via a telephone switch with a first party and a second party attempts to place a second telephone call to the user via the switch, the method and apparatus advise the second caller that the user is engaged in a telephone conversation and allow the second caller to determine whether to interrupt the user or choose another alternative. The user can then decide whether to accept the call from the second caller, putting the first caller on hold, or to refuse the second call. Alternative embodiments are disclosed where the user is advised of the identity of the second caller (or wherein the user has previously authorized certain callers to interrupt a current call with a new call), and then the user can decide whether to accept the call from the second party (placing the first party on hold) or to deny the second party (in which case the second party is transferred to a message center).

27 Claims, 12 Drawing Sheets

U.S. PATENT DOCUMENTS

| | | | |
|---|---|---|---|
| 4,266,098 | 5/1981 | Novak | 379/199 X |
| 4,277,649 | 7/1981 | Sheinbejn | 379/201 |
| 4,313,035 | 1/1982 | Jordan et al. | 379/207 |
| 4,369,339 | 1/1983 | Castro et al. | 379/197 |
| 4,578,540 | 3/1986 | Borg et al. | 379/355 X |
| 4,625,081 | 11/1986 | Lotito et al. | 379/211 X |
| 4,642,425 | 2/1987 | Guinn, Jr. et al. | 379/210 X |
| 4,674,115 | 6/1987 | Kaleita et al. | 379/201 |
| 4,680,785 | 7/1987 | Akiyama | 379/57 |
| 4,740,788 | 4/1988 | Konneker | 379/211 X |
| 4,748,655 | 5/1988 | Thrower et al. | 379/60 |
| 4,752,951 | 6/1988 | Konneker | 379/211 |
| 4,878,240 | 10/1989 | Lin et al. | 379/201 X |
| 4,879,743 | 11/1989 | Burke et al. | 379/210 X |
| 4,893,335 | 1/1990 | Fuller et al. | 379/200 |
| 4,896,346 | 1/1990 | Belfield et al. | 379/196 X |
| 4,899,358 | 2/1990 | Blakely | 379/215 X |
| 4,899,373 | 2/1990 | Lee et al. | 379/201 X |
| 4,947,421 | 8/1990 | Toy et al. | 379/215 X |
| 5,027,384 | 6/1991 | Morganstein | 379/211 X |
| 5,060,255 | 10/1991 | Brown | 379/211 X |
| 5,063,588 | 11/1991 | Patsiokas et al. | 379/142 X |
| 5,109,405 | 4/1992 | Morganstein | 379/210 X |
| 5,260,986 | 11/1993 | Pershan | 379/207 X |
| 5,263,084 | 11/1993 | Chaput et al. | 379/142 X |
| 5,307,399 | 4/1994 | Dai et al. | 379/57 |
| 5,315,636 | 5/1994 | Patel | 379/211 X |
| 5,410,541 | 4/1995 | Hotto | 379/97 X |

5,825,867

ENHANCED CALL WAITING

CROSS REFERENCE TO RELATED APPLICATIONS

This application is a Continuation-in-Part of U.S. patent application Ser. No. 07/480,242 filed Feb. 15, 1990 (now U.S. Pat. No. 5,375,161, issued Dec. 20, 1994), which is a Continuation-in-Part of U.S. patent application Ser. No. 07/439,601 filed Nov. 21, 1989, now abandoned, which is a Continuation-in-Part of U.S. patent application Ser. No. 06/841,931 filed Mar. 20, 1986 (now U.S. Pat. No. 4,893,335, issued Jan. 9, 1990), which is a Continuation-in-Part of U.S. patent application Ser. No. 06/650,821 filed Sep. 14, 1984, now abandoned. Each one of the aforementioned U.S. Patent Applications is hereby incorporated herein by reference.

TECHNICAL FIELD

This invention relates to the field of telecommunications and more particularly to an enhanced call waiting service which telecommunication providers can provide to their customers.

BACKGROUND OF THE INVENTION

Telephone companies have provided, for a number of years, a call waiting service to which their customers may subscribe. If a customer subscribes to the call waiting service, then when the customer is on the telephone talking with a first party and a second party telephones them during the course of the conversation with the first party, then the customer will hear a beep in the earpiece of the telephone to alert them to the fact that another call is waiting. The customer can then transmit a flash hook to the telephone company's central office, placing the conversation with the first party on hold and connecting the customer with the second party, allowing the customer to then enter into a conversation with the second party. However, the customer has no way of knowing who the second party is when they hear the beep in the earpiece and they have no idea whether or not the call from the second party is sufficiently urgent to warrant interrupting the conversation with the first party.

Newer methods for call delivery to a customer are or will soon be implemented. For example, the Integrated Services Digital Network (ISDN) will have digital signaling channels for notification of an attempt, on the part of the network, to deliver a call to a customer. With ISDN, a customer can be notified of the attempt to deliver the call even though the customer may be engaged in a telephone call or connection with another party. Such notification can be made at the customer's telephone station or at a separate terminal. Additionally, the customer can also receive information related to the second call, such as Calling Line IDentification (CLID). This information may be displayed on the customer's station. Given this information, i.e., the telephone number of the calling party, the customer may elect to put the call in progress on hold and to connect with the new call. Other options are also available, as is described, e.g., in the AT&T document 5ESS ISDN Basic Rate Interface Spec. 5E6 Software Release, the Bellcore "National ISDN-1" Document No. SR-NWT-001937, February 1991, the Bellcore "National ISDN-2" Document No. SR-NWT-002120, May 1992, and the AT&T document "5ESS Switch—The Premier Solution Feature Handbook" Document No. 235-390-500, dated September 1987, all of which are hereby incorporated herein by reference. However, ISDN does not allow the calling party to identify the urgency of their call or to provide the user with a notification initiated by and defined by the calling party.

The instant invention addresses the problems noted above by providing an Enhanced Call Waiting System which pre-screens the call from the second caller to determine a level of urgency before interrupting the customer advising that a call is waiting. The invention also includes means by which information regarding the new call can be communicated to the customer so that they can decide what action should be taken, if any.

BRIEF DESCRIPTION OF THE INVENTION

In general terms, the invention provides a method and apparatus for providing an enhanced call waiting telecommunication service to a user when the user is engaged in a telephone conversation via a telephone switch with a first party at the same time a second party attempts to place a telephone call to the user. In accordance with the invention, telephonic instructions are received from the second caller to initiate a telephone call between the second party and the user. Generally speaking, the telephonic instructions take the form of the user's telephone number which is inputted by the second party at their telephone instrument. The fact that the user's telephone is busy is detected and, in response thereto, a courtesy message is transmitted to the second party, for example, inviting the second party to input a command corresponding to available options. The courtesy message may include the command to be inputted or the command may not be explicitly given during the courtesy message. In any event, the method and apparatus allow the second party to input a command, if they know it. Otherwise the call is handled in a predetermined fashion when no command is entered. The command may comprise, for example, a number or other code to be entered at the keypad of the second party's telephone. The command can include other commands, including spoken commands which would then be detected and interpreted by a computer system. Voice detection apparatuses are currently available and indeed are already embodied in some computer systems and therefore they are not described herein. Those skilled in the art will appreciate that commands which are described as being entered at a keypad herein may be implemented by responding instead to voice commands if appropriate voice detection subsystems are added. If desired, a hierarchy of commands may be available for use which correspond to alternatives the caller may select. Additionally, or alternatively, in some embodiments, the method and apparatus may issue a courtesy message asking the second party to state their name or purpose of the call before routing the call. Assuming that the command is inputted by the second party (or their name or other information is stated, in those embodiments, as their spoken name or other information may comprise the command), then the call from the second caller is directed according to the command received indicating direction to the user with a priority forwarding code causing a beep or other indication to be heard at the user's telephone.

DETAILED DESCRIPTION

Adjunct Switch Embodiment

Figure 1:
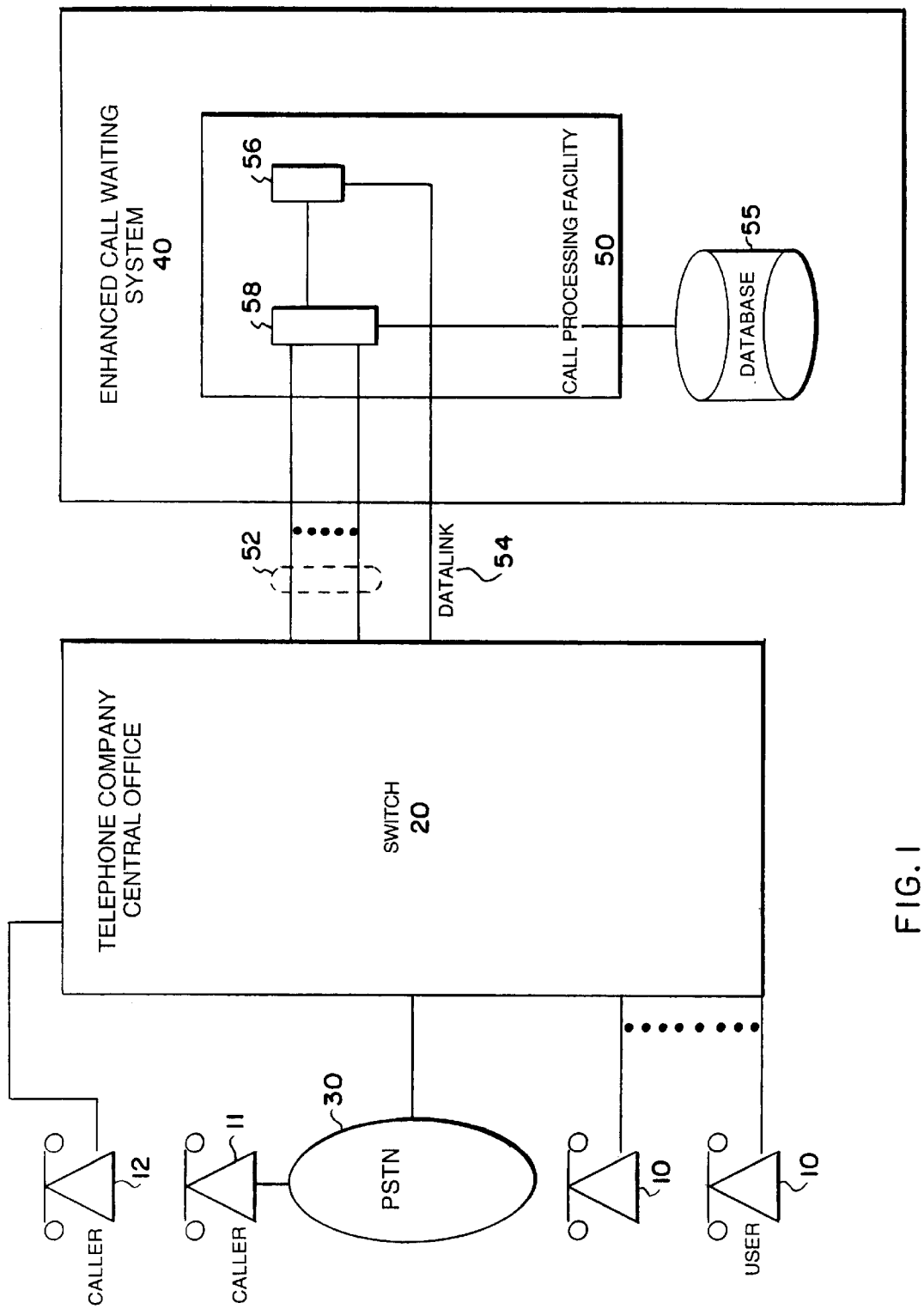
FIG. 1 is a schematic diagram of the Enhanced Call Waiting System of the present invention.

FIG. 1 is a schematic diagram of one embodiment of the Enhanced Call Waiting System 40 of the present invention. In this embodiment the apparatus and method of the invention control a switch which may be located, for example, in the central office of the telephone company directly. Another embodiment is described subsequently in detail in which a controlled switch is embedded with the apparatus of the present invention. The embedded switch embodiment can provide additional features which would not be currently available using switches currently installed in telephone company central offices.

While a plurality of users may be connected to the Enhanced Call Waiting System 40, a single user having a telephone device 10 is depicted in FIG. 1 for clarity's sake. Telephone device 10, which may be a conventional telephone, is connected to a switch at the telephone company's central office 20 or any other branch exchange and even to a PBX switch. A number of other callers having telephones 11 and 12 are also coupled to the switch at the telephone company's central office 20, either directly or via the public switched telephone network (PSTN) 30. The other callers may be users of the Enhanced Call Waiting System 40 or not, depending on how this service is provided. Thus, the Enhanced Call Waiting System service may be provided to all callers connected to a switch or it may only be provided to those callers who elect to subscribe to this service.

The Enhanced Call Waiting System includes a programmed call processing facility 50 which, under software control, provides the Enhanced Call Waiting System 50 which will be described henceforth. The programmed call processing facility is coupled to the telephone company's central office switch 20 by means of a hunt group of telephone lines or other suitable communication facility 52 as well as preferably via a datalink 54. The datalink 54 preferably provides information regarding the identification of the calling party as well as the reason that the call is being delivered. For example, the Simplified Message Desk Interface (SMDI) datalink provided by DMS 100 switches manufactured by Northern Telecom provide the sort of information desired. The CMSS datalink in 5ESS switches provide similar information. The call processing facility, from a hardware aspect, may be embodied as is described in U.S. patent application Ser. No. 07/480,242 filed Feb. 15, 1990, the disclosure of which is hereby incorporated herein by reference. As described in U.S. patent application Ser. No. 07/480,242, a call processing facility includes a computer 56 and an interface 58 for interacting the telephone lines 52 to the computer 56. The computer 56 may be an industry standard device well known in the art, such as, for example, a fault-tolerant computer, such as a Stratus R-5, or even a personal computer of the well known IBM PC type and preferably using the Intel 486 chip (or better) with a disk operating system (such as the UNIX operating system). The telephone line interface 58 may be provided by cards which plug into the computer 56, such as model D41B interface cards manufactured by Dialogic. The SMDI datalink 54 is connected to computer 56 via an RS232 serial port on the computer.

The hunt group 52 is associated with the datalink 54 such that when a call is received by the Enhanced Call Waiting System 40 over one of the lines in the hunt group 52, a data message is also passed by the telephone company's central office switch 20 over the SMDI datalink indicating the reason for the call, the number which was called and, if available, the telephone number of the telephone or party from which the call originated. This latter feature is known by several names, including Automatic Number Identification (ANI) and Calling Line IDentification (CLID), among others. Using CLID is preferred since ANI is often used to convey a billing number rather than the actual number associated with the third party. For many telephone users, the ANI and CLID are the same, but that will often not be the case in businesses which used Direct Inward Dial (DID) numbers. The telephone lines in the hunt group 52 have a feature provided by the telephone company's central office switch 20 known as call transfer capability.

The users of the Enhanced Call Waiting System 40 have the well-known Busy Forwarding, and may have No Answer Forwarding, features available in switch 20 for their telephones 10. If the user station 10 is busy with a call from one caller (e.g., a caller at station 11) directly, then calls from a different caller (e.g., a caller at station 12) will be busy forwarded to the Enhanced Call Waiting System 40 by switch 20, assuming that the user's telephone 10 has the Busy Forwarding feature of switch 20 enabled. A transfer will also occur when the user fails to answer telephone 10 assuming that the No Answer Forwarding feature of switch 20 is enabled. As will be seen, in order for the Enhanced Call Waiting System to function as described herein, the telephone company central office switch 20 must be permitted to override (i.e., ignore) the Busy Forwarding feature of the user's phone by employing a so-called "Dial Call Waiting Feature" commonly available on telephone company central office switches 20 such as the 5ESS switch manufactured by AT&T. In this case all users are defined as belonging to a Terminal Group so that the Dial Call Waiting Feature is effective for them.

Users of the Enhanced Call Waiting System 40 are identified preferably by their telephone numbers which are preferably stored in a database 55. In that way, the computer, under program control, can check the database to verify who are users and who are not, to retrieve recorded announcements and various operational parameters.

This Enhanced Call Waiting System 40 operates as follows. When a caller at station 11 or 12 attempts to reach a user 10, if the user's line is busy, then the central office switch 20 forwards the call to a lead number in hunt group 52. Referring to the flow chart of FIG. 2, the computer 56 in the call processing facility 50 of the Enhanced Call Waiting System 40 waits for a call to come in on one of the lines of the hunt group. This waiting is handled by loop 62. When a call comes in, the call is answered and the SMDI datalink is examined for the data accompanying the call at steps 64, 70, 76 and 80. A test made at step 64 is to determine whether or not the call coming into the hunt group is a direct or transfer call from a user. If it is not from the user (either directly or via a transfer), then the SMDI will contain an ANI or CLID which cannot be found in database 55. If the ANI or CLID is from the user's telephone, as identified in database 55, then the SMDI reason code will correspond to the letter D (for direct call from the user), the letter N (for a call forwarded due to a no answer at the user's phone) or B (for a call forwarded due to a busy user's telephone). The test at step 64 will catch those callers who accidentally miss-dial the number of the hunt group. They are shuttled off to step 66 where they may be advised how they may order the system and then the system hangs up on them and returns back to the loop at steps 60 and 62 via step 68. The information conveyed regarding how the system may be ordered can be stored, for example, in database 55.

Assuming that the incoming call on the hunt group is from the user's telephone, i.e., the ANI or CLID corresponds to a user's telephone number stored in database 55, then the accompanying SMDI reason code will be either the letter D, the letter N or the letter B. If it is the letter D, as tested at step 70, that means that the call from the user's telephone is a direct call from the user, and not a forwarded call. In that case, the user is asked for a Personal Identification Number (PIN) at step 72 and, assuming the PIN is entered correctly (i.e., it corresponds to the user's PIN stored in database 55), the user is permitted to listen to previously recorded messages stored in database 55 or advised that there are no messages stored. Recorded messages can, of course, be deleted from database 55 in a manner well known in the prior art. The program again returns to loop 62 at step 74.

If the SMDI reason code is the letter N, as tested at step 76, that means that the user did not answer the telephone and therefore the central office switch is transferring the call for that reason. The Enhanced Call Waiting System 40 then plays a message (which may be stored in database 55) at block 78 indicating that the party is unavailable and thereafter, at step 86, the caller is invited to leave a message for the user they are trying to call and the caller's message is recorded and stored in database 55, in a manner well known in the art. If Message Waiting Indication (MWI) facilities are available at the user's telephone station, as tested at step 90, then MWI is set at the user's telephone station at step 92. This could comprise, for example, turning on an LED at the user's telephone indicating that the user has a message waiting.

If the SMDI reason code is the letter B, as tested at step 80, that indicates that the call was forwarded to the Enhanced Call Waiting System 40 due to a user's busy telephone. In that case, the caller is advised at step 82 that the line is busy and is invited to enter a command or code and optionally also to state their name or reason for the call at the tone or alternatively to hold the line and leave a message. If the command or code is not properly received at step 84, or if no command or code is entered, then the caller is prompted to leave a message and the message is recorded at step 86. If the caller enters the correct command or code at block 84, then the Enhanced Call Waiting System 40 responds by effectuating the appropriate alternative corresponding to such command including, if appropriate, sending a signal to the telephone company office switch 20 at block 88. For the model 5ESS switch manufactured by AT&T, the signal may comprise a special access code indicating that the Dial Call Waiting feature is to be invoked followed by the user's home telephone number. This number may be one of several numbers assigned to the user's phone line designed to produce differing indications to the user through the invocation of the Distinctive Alerting feature in conjunction with the Dial Call Waiting treatment to the line. Thereafter, this system 40 hangs up and it goes back to the loop comprising steps 60 and 62. The switch 20, in response to the Dial Call Waiting feature capability of the 5ESS switch, will cause a call waiting tone at the user's busy telephone to occur, thereby advising the user that a call is waiting. Other switches may not have a Dial Call Waiting feature exactly as described above. However, when such central office switches are used, then other techniques can be used to ensure that the call from the system 40 gets through to the user 10 while other calls to the user are forwarded to the Enhanced Call Waiting System.

The user can be advised of the relative urgency or importance of the call as will now be described. If the user has the Distinctive Ringing feature of the 5ESS switches enabled, then when a call is transferred by the system using the Dial Call Waiting feature, the call waiting tone heard by the user is a function of which telephone number is used to contact the user. As is known in the art, Distinctive Ringing allows a user to have multiple telephone numbers associated with a given line and the telephone(s) connected to the line ring distinctively depending upon the number called. In this case the Enhanced Call Waiting System previously described may be modified slightly to receive urgency information from the caller and then to selectively dial a telephone number associated with the user's telephone line as a function of the indicated urgency. Alternatively, the Enhanced Call Waiting System may selectively dial the telephone numbers associated with the user's telephone line as a function of the CPID of the caller. CPID is Calling Party IDentification and can be derived, in some cases, from ANI, CLID, or by information input by the caller. The Enhanced Call Waiting System then dials out to the user's phone using the special access code needed to invoke the Dial Call Waiting feature plus a telephone number associated with the indicated urgency/importance of the call. The number selected is one of the numbers associated with the Distinctive Ringing feature on the user's phone. The user, who is then engaged in a telephone call with a first person, will hear a distinctive call waiting tone which indicates the level of urgency or importance identified by the caller directly, or by the caller's CPID. While the flow diagram of FIGS. 2 does not provide for this particular feature, those skilled in the art should be able to modify them to include it. Moreover, another embodiment of the Enhanced Call Waiting System will be described with respect to FIGS. 3 and 4A–4I which also provide for not only this feature but other additional features.

The Enhanced Call Waiting System, which has been described above, works as follows. Assume that Pat is trying to reach Bob. She calls Bob's home telephone number and Bob is not on the line, so the central office delivers the call to Bob's home phone and Bob answers the call. Bob and Pat now engage in a telephone conversation.

Now, assume that while Bob and Pat are tailing, Fred tries to telephone Bob. This time, Bob's telephone line is busy, so the central office uses its busy forwarding feature, which Bob has, to forward the second call from Fred to the Enhanced Call Waiting System 40. The Enhanced Call Waiting System 40 answers the call and recognizes that since it received the call with a proper ANI (due to the fact that the call was forwarded from Bob's number and Bob's number is stored in database 55) and with a SMDI reason code of "B", that means that Bob's phone is busy and the system then plays a courtesy message to the caller saying something like "I'm sorry, Bob is on the line, but if it is urgent that you to speak with him now, touch 1 and I will try to connect you. Otherwise, please hold the line and leave a message". If Fred touches 1, because he needs to get through to Bob, the Enhanced Call Waiting System 40 will send a signal to the public switch (typically in the form of a flash hook to acquire a second dial tone, dial a call waiting code, and then dial Bob's home telephone number). Since Bob is already on the telephone, ordinarily calls to him would be busy forwarded right back to the Enhanced Call Waiting System 40. However, since the Enhanced Call Waiting System dialed the Dialed Call Waiting Code, and since the group of lines serving the Enhanced Call Waiting System 40 are so equipped, they are permitted to override the busy forwarding feature on Bob's home telephone line, and Bob hears a prompt (usually a tone or beep) indicating that a call is waiting. Therefore, the call from Fred will be sent through to Bob and Bob will hear a call waiting tone permitting him to excuse himself temporarily from his telephone conversation with Pat, do a flash hook and pick up the second call. The system 40 need not wait for Bob to act on the transfer call from Fred, since that function is provided by the telephone company central office switch 20.

With this system, a large majority of the calls to Bob will flow to him without ever activating the Enhanced Call Waiting System 40. Only those calls when Bob is actually on the line or when Bob does not answer the telephone call will go through the Enhanced Call Waiting System 40. Of course, this system can be modified or programmed so that it only handles "busy forwarded calls", and not "no answer forwarded calls", or vice versa. In any case, the Enhanced Call Waiting System 40 uses relatively inexpensive equipment to provide this feature as an adjunct to the telephone company central office switch, without having to modify the software in that switch, which is a time consuming and tedious process. Moreover, the Enhanced Call Waiting System 40 is only coupled to the caller for a relatively short period of time to play the courtesy message and to receive a reply (or to timeout waiting for a reply), and therefore, from a resource aspect, a relatively small amount of computational power is used by the Enhanced Call Waiting System to provide this feature to customers. These features are preferably interrupt driven so that the Enhanced Call Waiting System 40 can handle a plurality of transferred calls at the same time for a number of different users. Thus, the system is capable of handling many, many users.

Figure 2:
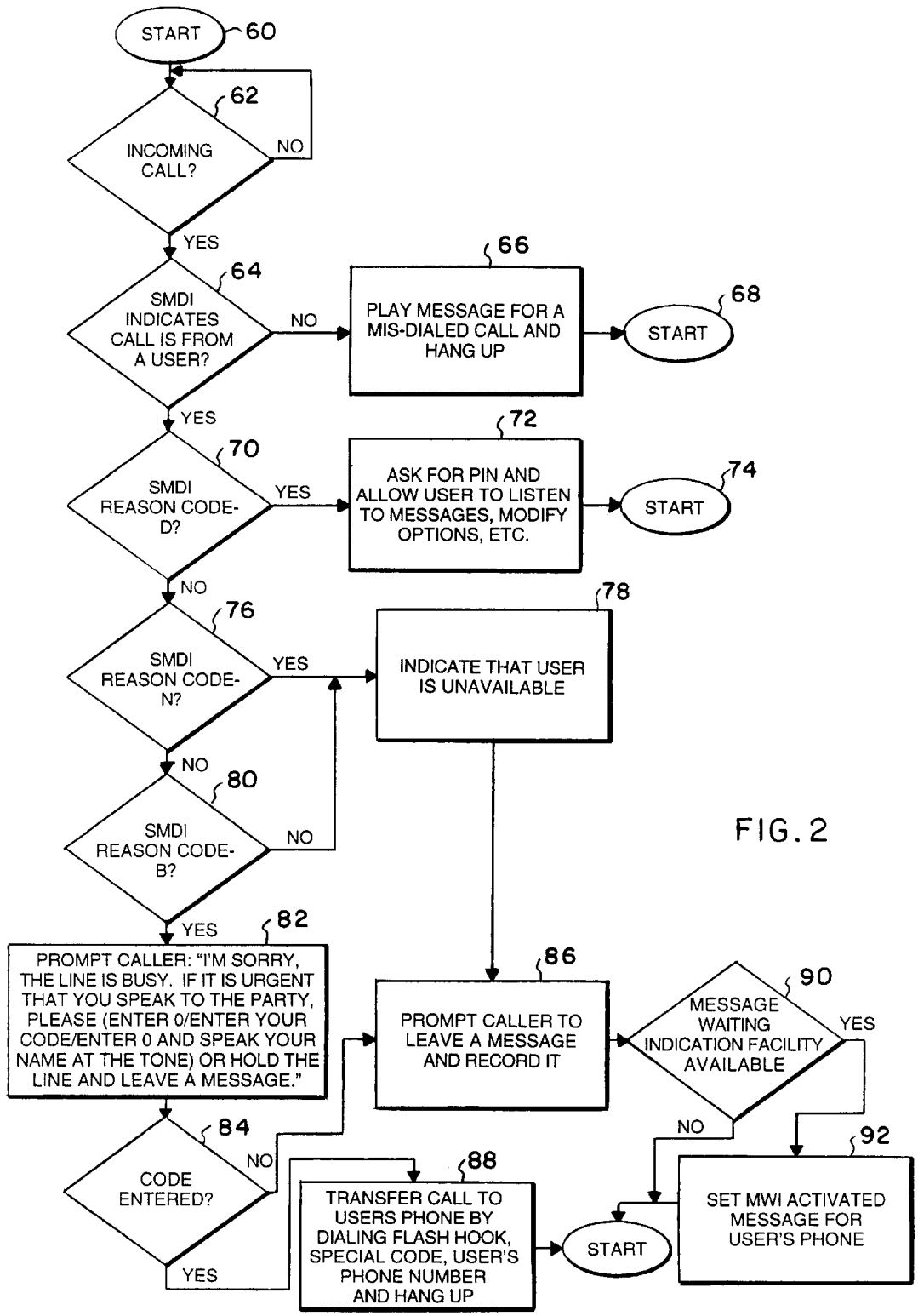
FIG. 2 is a flow diagram showing the processing capabilities of the call processing facility of the Enhanced Call Waiting System of FIG. 1.

The flow chart of FIG. 2 presents an embodiment of the invention which can be used with many of the central office switches in use today in the United States. Those skilled in the art will appreciate that the Dial Call Waiting feature is a special feature of the 5ESS switch sold by AT&T, but that there are techniques for implementing the features described above in other switches.

Figure 3:
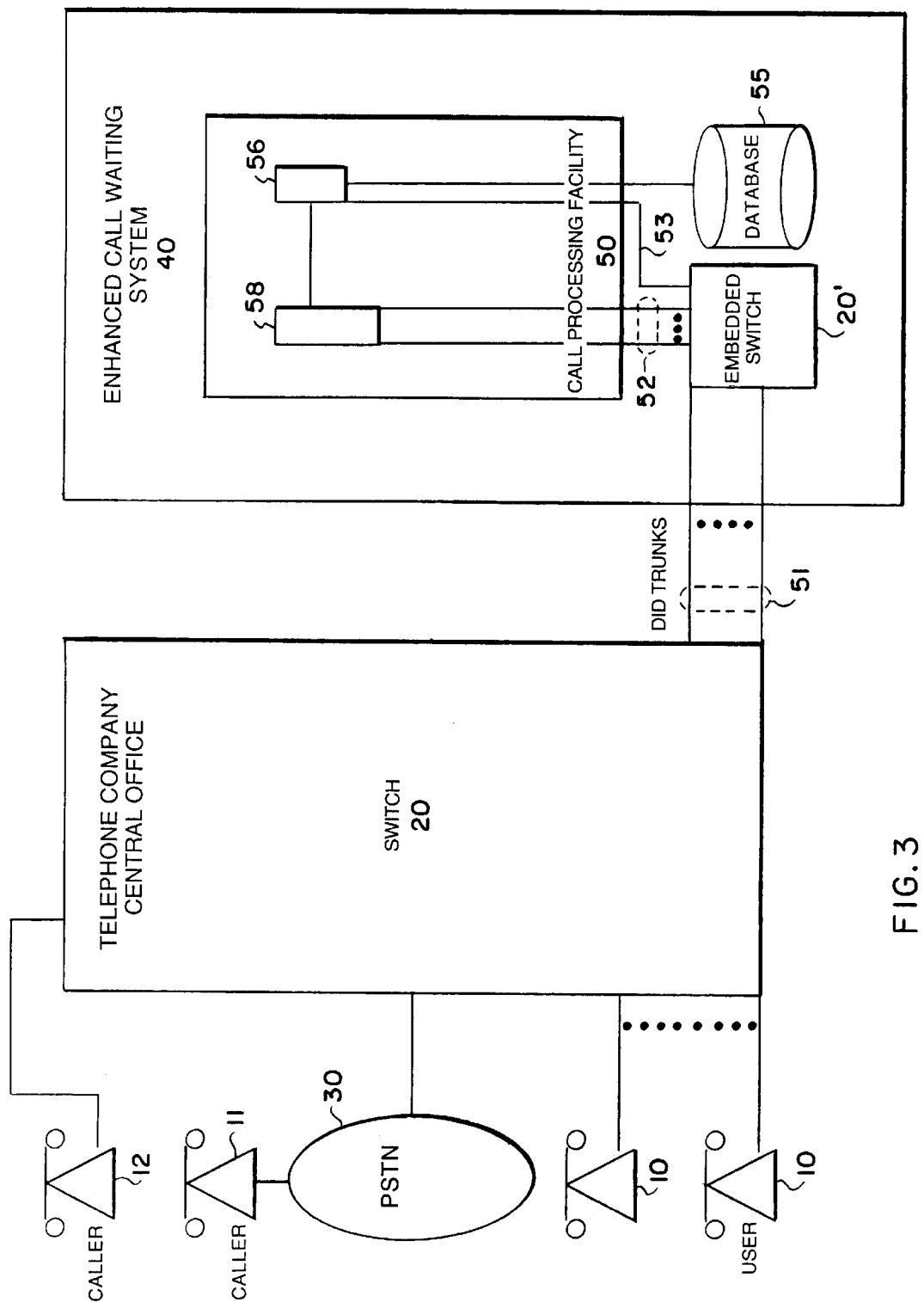
FIG. 3 is a schematic diagram of another embodiment of the Enhanced Call Waiting System of the present invention, this embodiment having an embedded switch.

However, there still exist switches serving customers which have very little capability to transfer or forward calls. Such switches are often called step by step or cross bar switches. In order to use the present invention with such switches, another embodiment of the present invention will be described which has its own switch as a part of the Enhanced Call Waiting System. A block diagram of such an Enhanced Call Waiting System with an Embedded Switch is depicted in FIG. 3. This embodiment functions independently of the type of switch used in the local office and thus provides a number of benefits over the embodiment described above. First, as will be seen, additional features can be provided. Second, it is simpler to provide the Enhanced Call Waiting System features in a sophisticated context using a single switch as opposed to supplying these features in the context of many different models of switches which already exist in telephone company local switching offices. Third, it is desirable for these features to move with the user as he or she changes physical location. As is described in U.S. patent application Ser. No. 07/480,242 filed Feb. 15, 1990, it is desirable for a user to be assigned a single telephone number which they use irrespective of their physical location. Their telephone number in effect follows them as they move from home to car to office to elsewhere. The resulting call waiting service provided by the method and apparatus described herein will be much more uniform (and easier to control and deliver) in such an environment if the computer 56 only has to control one type of switch, and that is possible when an embedded switch 20' is provided in the Enhanced Call Waiting System. While this embodiment can be used with unsophisticated switches, there are good reasons to use it with highly sophisticated switches as well, since it simplifies programming efforts and provides greater uniformity in the telephone environment as seen by users of the public telephone system.

Embedded Switch Embodiment

FIGS. 4A–4I present flow diagrams which may be used with the embodiment of FIG. 3. The embedded switch 20' is, in this embodiment, preferably a model LNX2000 switch built by Excel Corporation of Sagamore Beach, Mass.

Those skilled in the art will appreciate that certain of the features which will now be described are susceptible to being used with non-embedded switches 20, including the 5ESS manufactured by AT&T or the DMS100 switch manufactured by Northern Telecom and commonly used today as central office switches by telephone companies. The Embedded Switch embodiment of the Enhanced Call Waiting System will now be described.

In FIG. 3, the Enhanced Call Waiting System with embedded switch 20' includes a programmed call processing facility 50 which, under software control, provides the Enhanced Call Waiting System which will be described henceforth. The programmed call processing facility is coupled to the embedded switch 20' by means of a group of telephone lines 52 as well as via a control link 53 coupled to a serial port of computer 56. The call processing facility, from a hardware aspect, may be embodied as is described in U.S. patent application Ser. No. 07/480,242 filed Feb. 15, 1990, the disclosure of which is hereby incorporated herein by reference. As described in U.S. patent application Ser. No. 07/480,242, a call processing facility includes a computer 56 and an interface 58 for interacting the telephone lines 52 to the computer 56. The computer 56 may be an industry standard device well known in the art, such as, for example, a fault-tolerant computer such as the Stratus R-5 or even a personal computer of the well known IBM PC type and preferably using the Intel 486 chip with a disk operating system (such as the UNIX operating system). The telephone line interface 58 may be provided by cards which plug into the computer 56, such as model D41B interface cards manufactured by Dialogic. The embedded switch 20' is connected with the PSTN 30 typically via a local telephone company switch (for tariff reasons), although conceptually, the embedded switch could be thought of as having direct access to the PSTN 30. Interface 58 is coupled to embedded switch 20' via a hunt group 52. Embedded switch 20' is connected with switch 20 via Direct Inward Dial (DID) trunk 51.

Each user 10 of the system preferably has a unique personal telephone number which is identified with switch 20' (that is, when the unique personal number is used on the PSTN 30, the call is delivered via switch 20'). A user may instead have a personal telephone number which is identified with another telephone company switch on the PSTN. If another (i.e., remote) telephone switch serves a user 10, then that switch should preferably be located such that calls delivered via the embedded switch do not result in additional tolls being paid by the user. Each user can be contacted at one or more physical locations (i.e., at telephone stations). The telephone numbers at the various stations at which the user may be located are preferably different. Thus when a caller 11 wishes to contact user 10 the caller 11 uses the unique personal telephone number of the user and the call is completed via switch 20' to the user 10 who is physically located at some location. Switch 20' can transfer the caller's call to the user since the telephone number at the user's physical location is stored in database 55. The telephone number at the physical location may be thought of as an unpublished telephone address routable by the PSTN and the user can control the routable telephone number which switch 20' will use to transfer calls to the user.

Turning now to FIGS. 4A–4I, FIGS. 4A–4C comprise flow diagrams which show the steps used to handle an incoming call and, more particularly, an incoming call from the user (when located at a known telephone number) which permits the user, in a supervisory mode, to retrieve stored messages and/or to change certain user-selectable functions.

FIGS. 4D–4H comprise a flow diagram which shows how a call is handled when it comes in from a third party telephone. If the call is from the user, then he or she is permitted to enter a PIN and enter the supervisory mode described with reference to FIGS. 4A–4C. The flow diagram of FIGS. 4A–4H represents a computer program, known herein as the Host Computer Call Control Process, which program runs on computer 56.

Figure 4A:
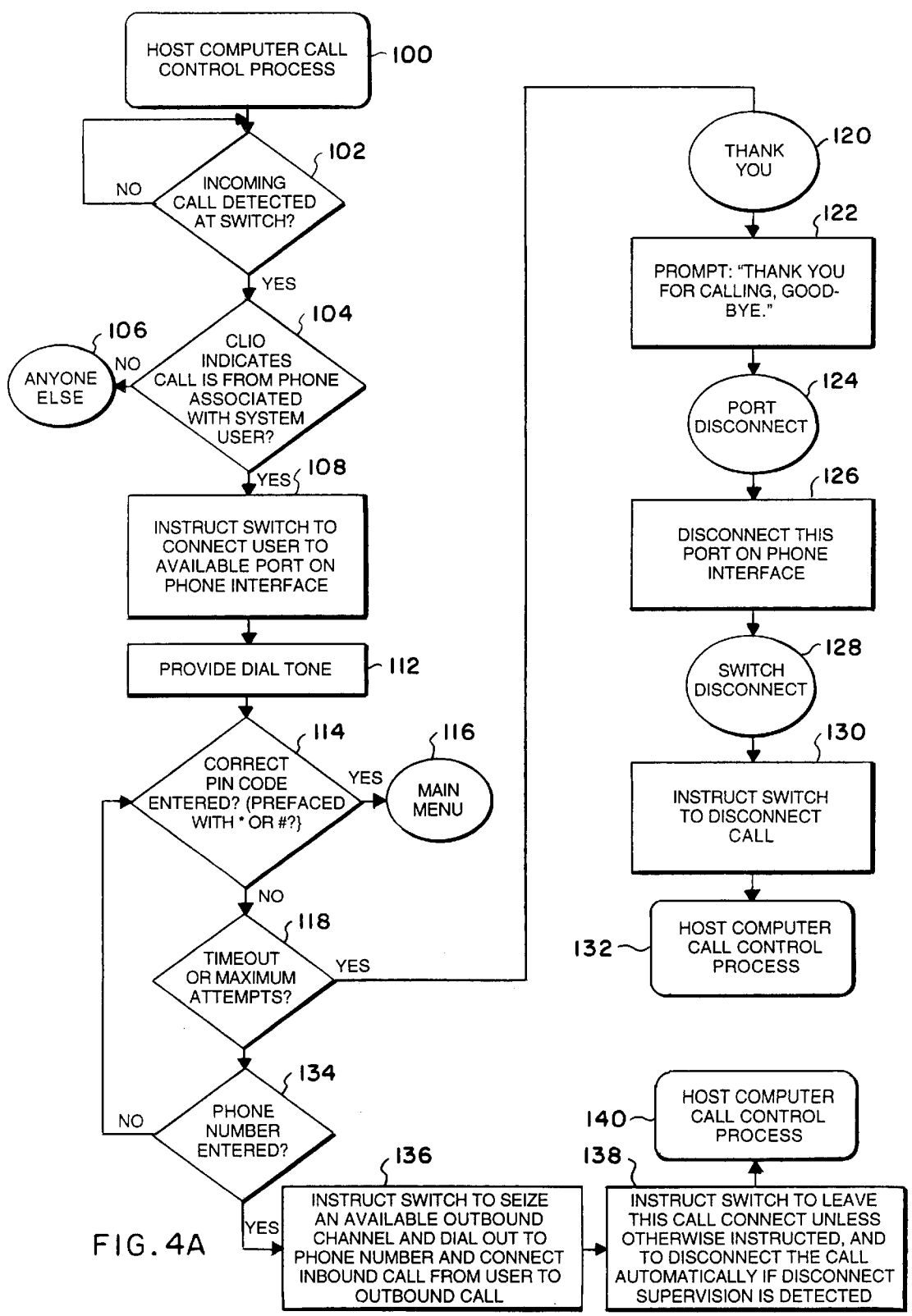
FIGS. 4A through 4I are flow diagrams showing the processing capabilities of the call processing facility of the Enhanced Call Waiting System of FIG. 3.
Figure 4B:
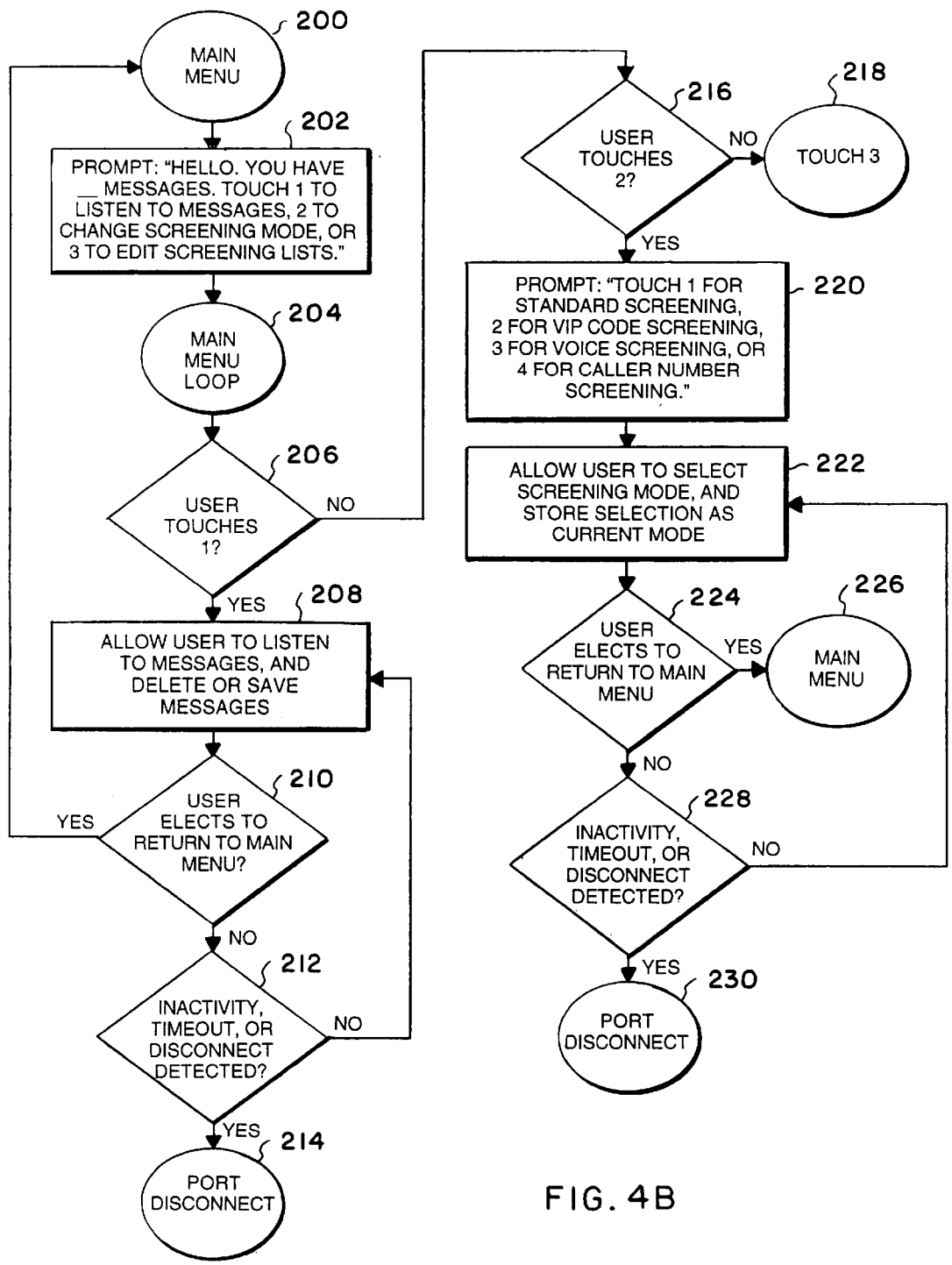
Figure 4C:
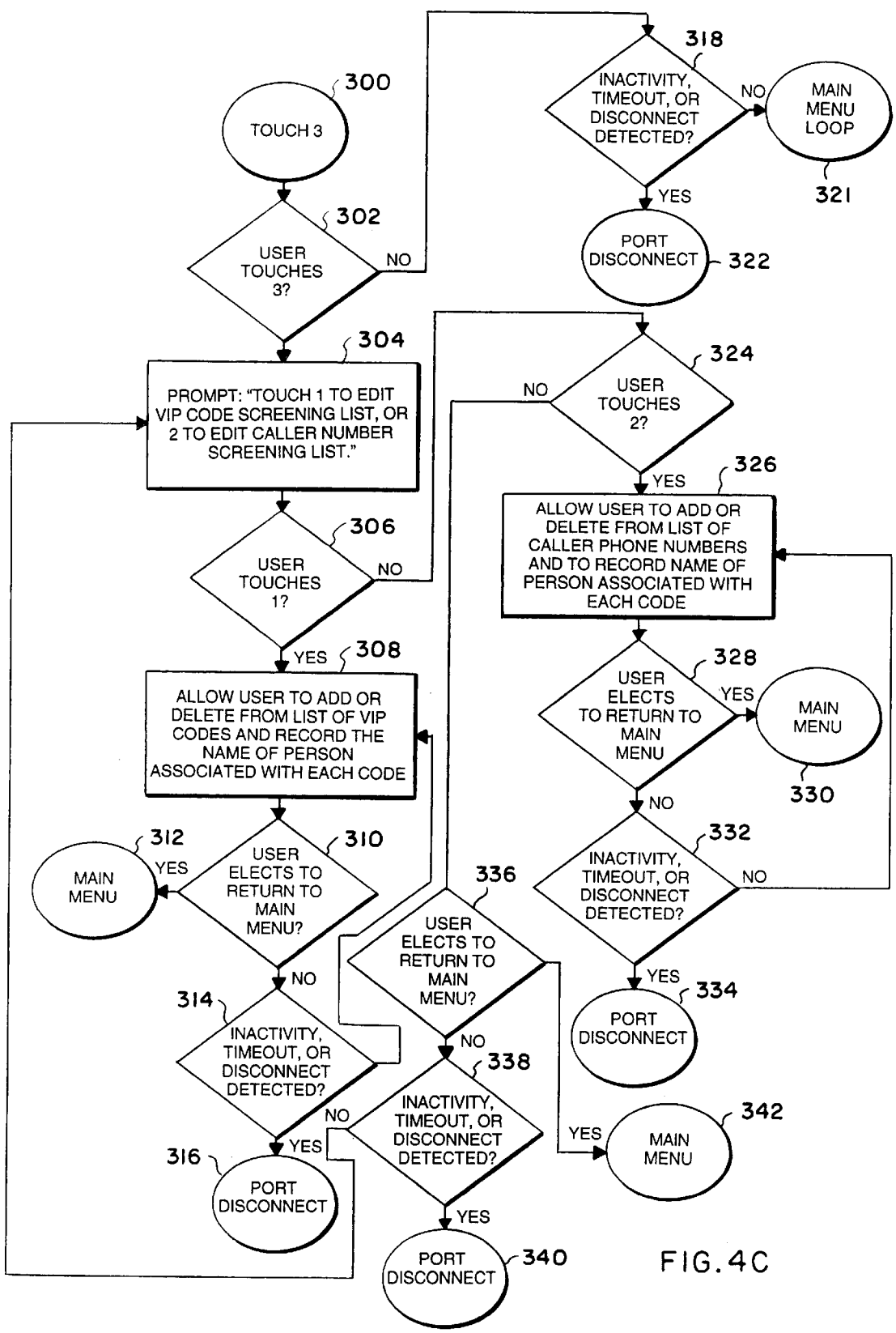
Figure 4D:
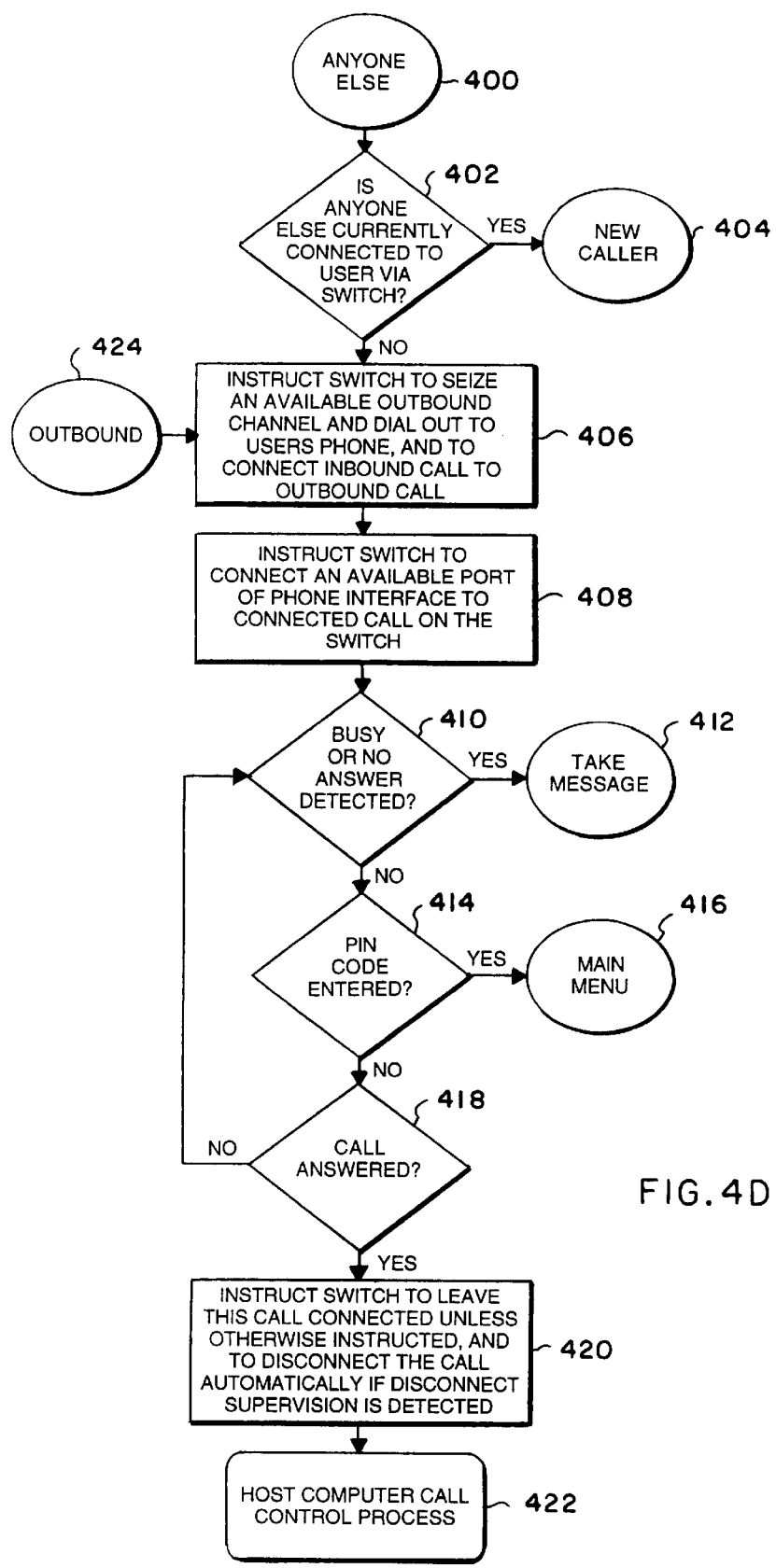
Figure 4E:
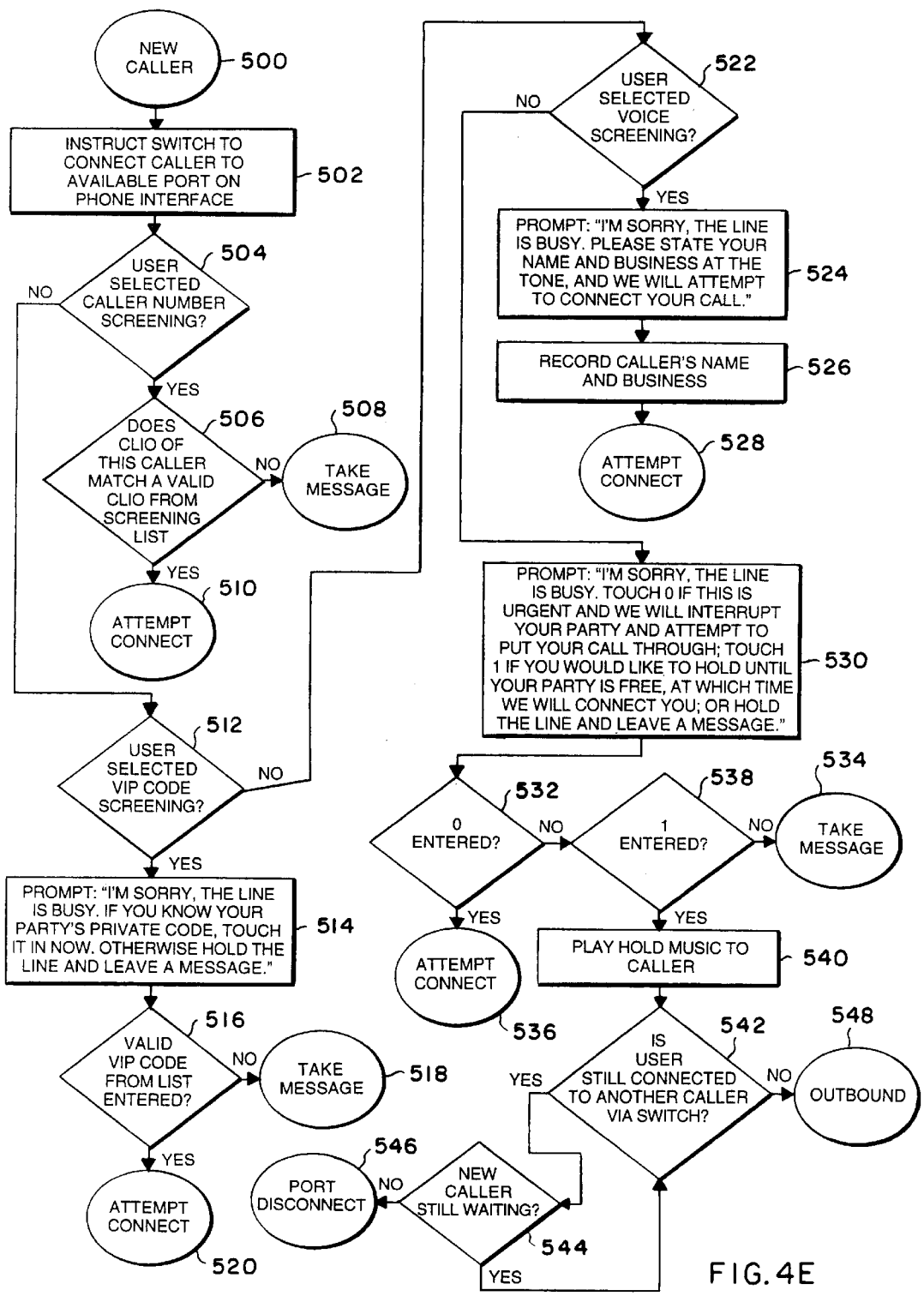
Figure 4F:
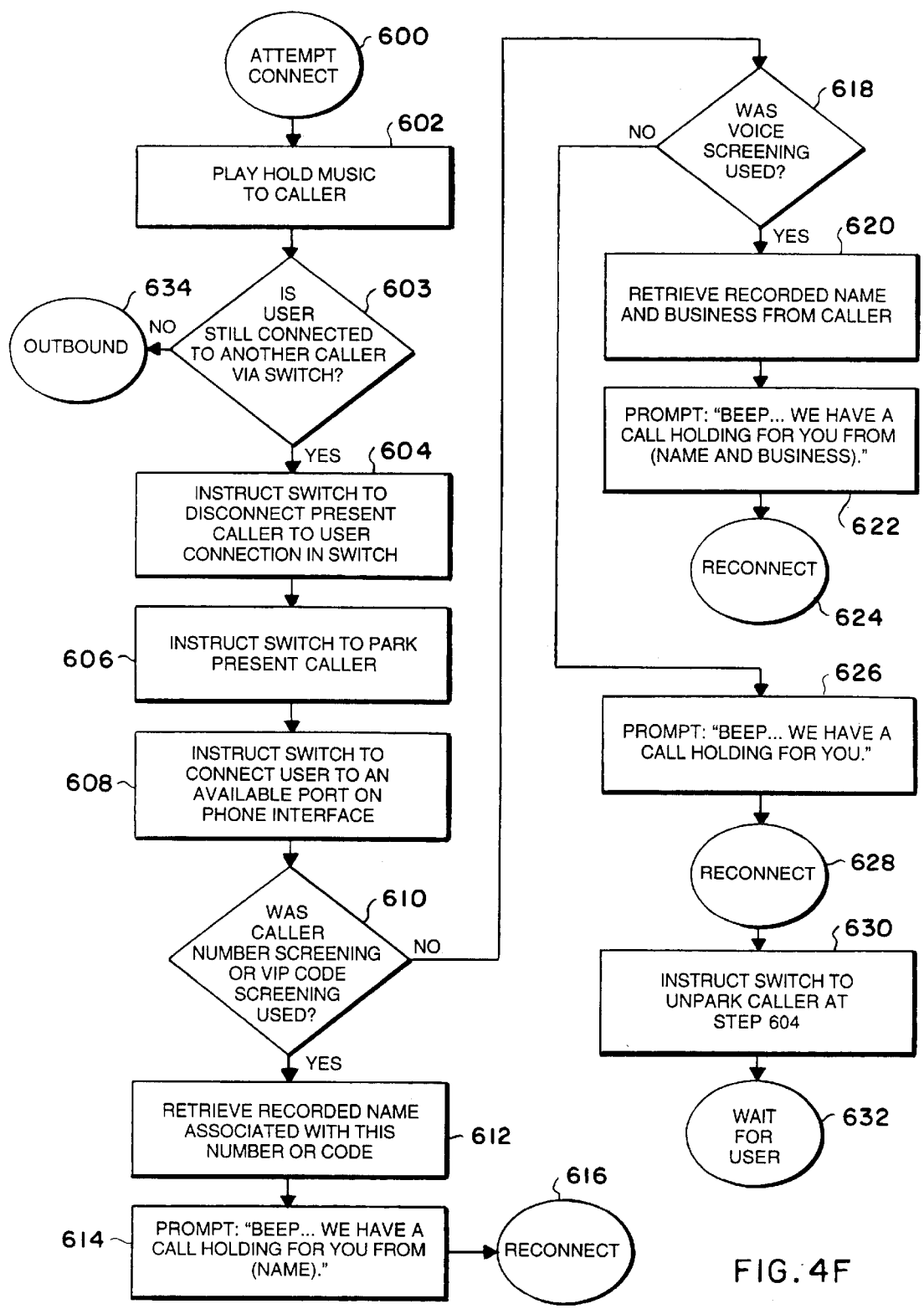
Figure 4G:
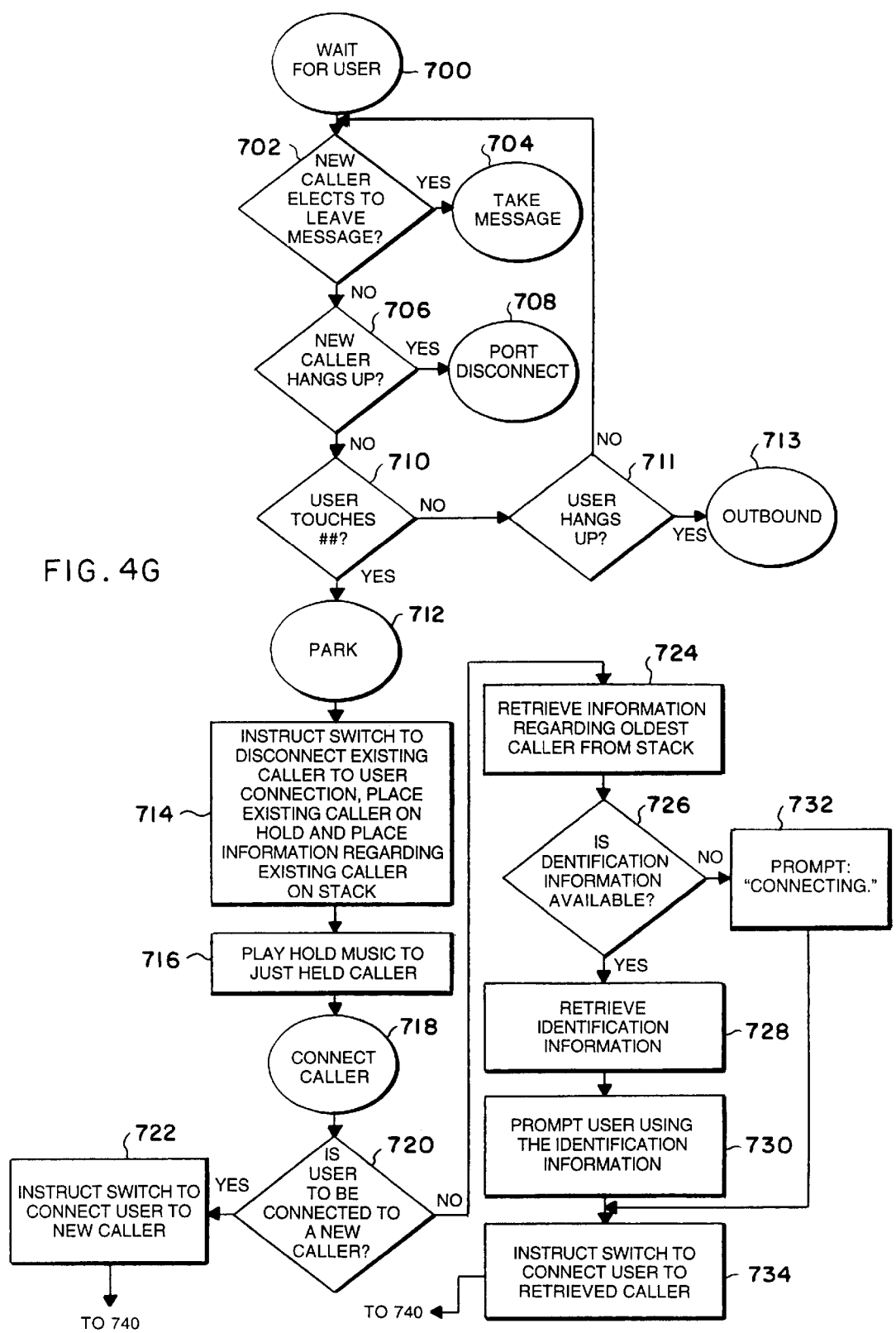
Figure 4H:
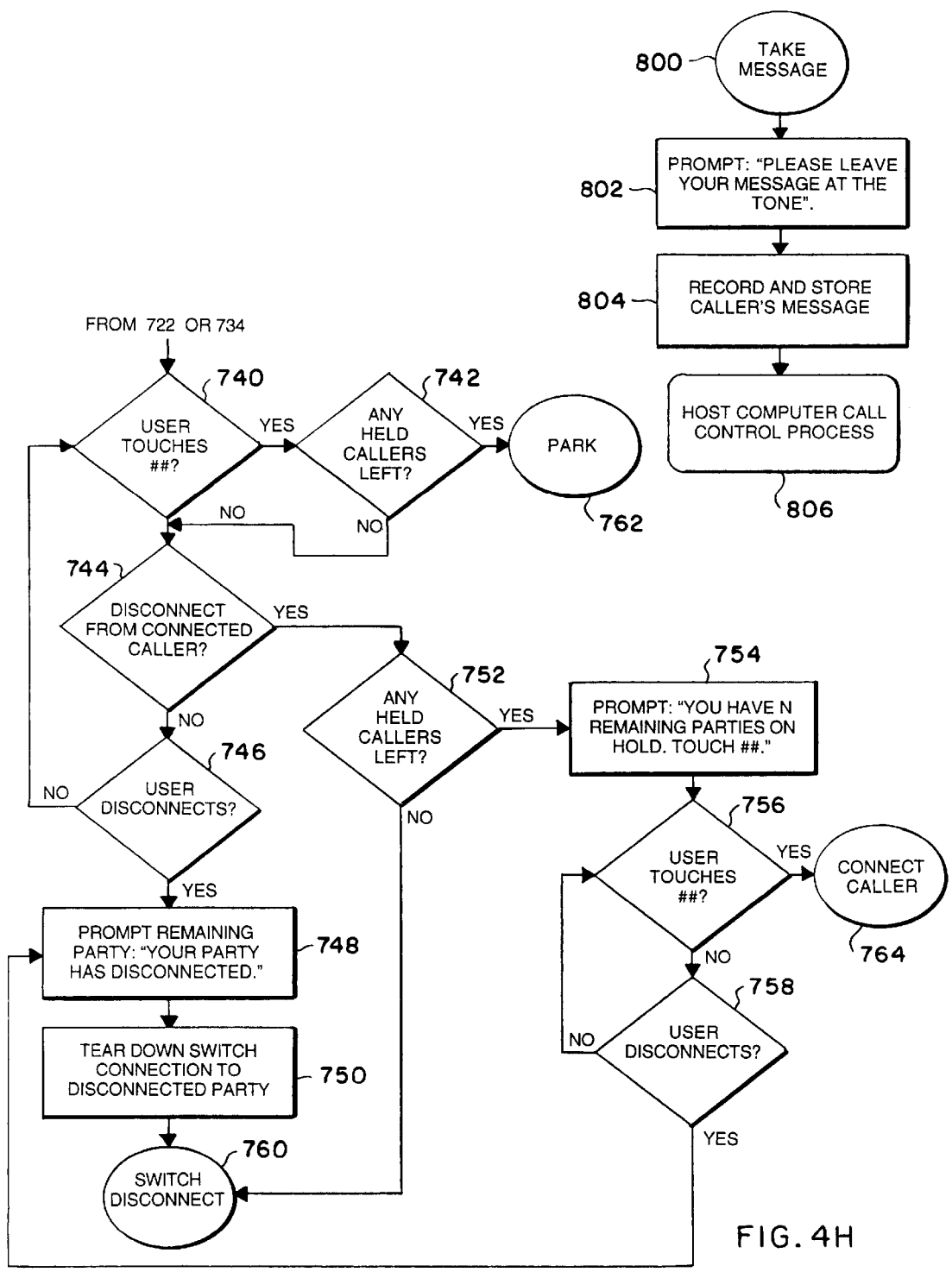
Figure 4I:
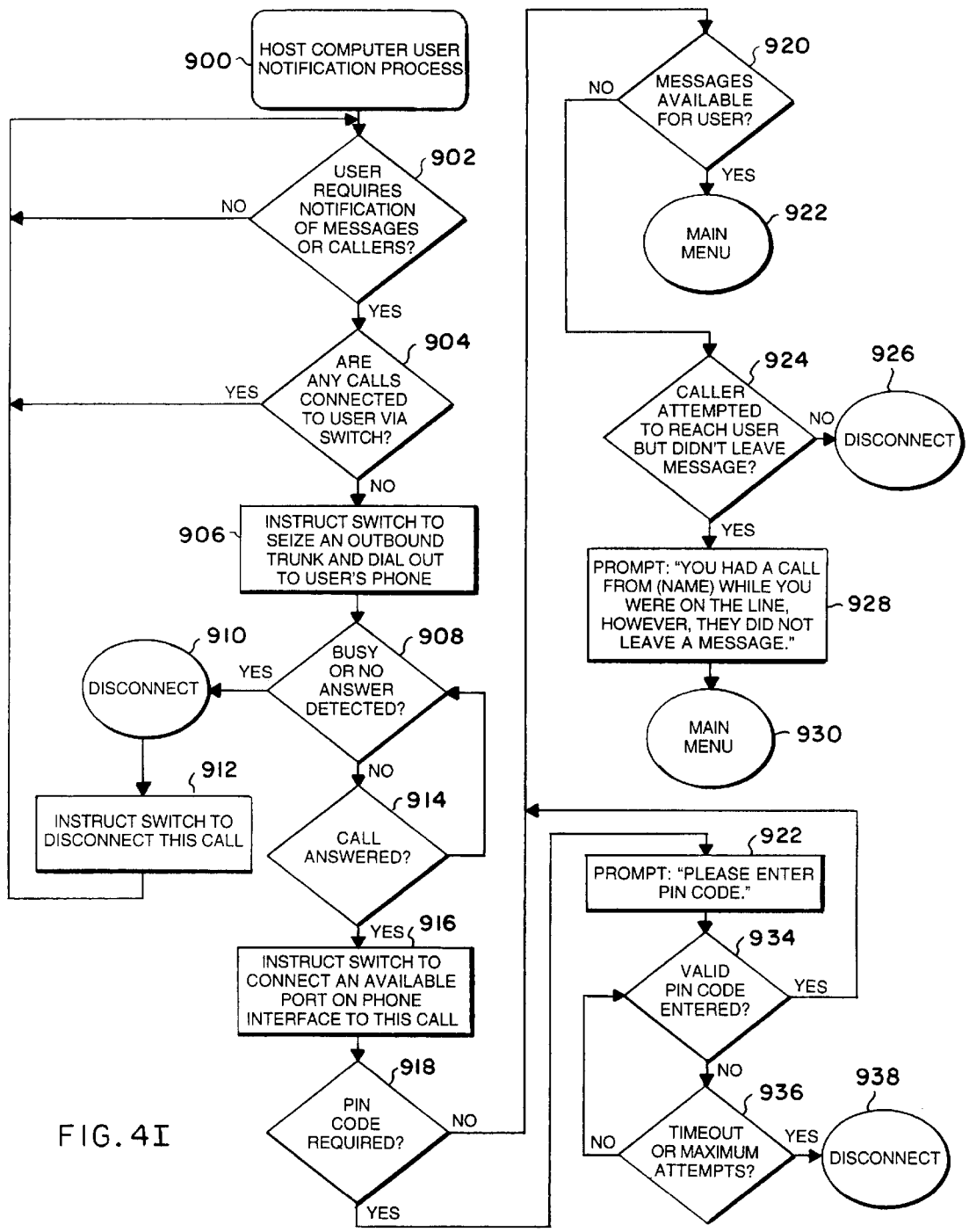

FIG. 4I is a flow diagram of a user notification process which notifies the user whenever a caller has unsuccessfully attempted to reach the user. Thus this figure represents a computer program, known herein as the Host Computer User Notification Process, which program also runs on computer 56. Since computer 56 preferably supports preemptive co-processing, both the Host Computer Call Control Process and the Host Computer User Notification Process can run at the same time. Moreover, these processes can be adapted by those skilled in the art to support numerous telephone connections at the same time with the different connections being independently handled concurrently by different portions of the flow diagrams.

I. Host Computer Call Control Process

Beginning at step 100 is the flow chart for a Host Computer Call Control Process, which is a software control program which executes on computer 56. This program controls the embedded switch 20' and the telephone interface 58 to implement Enhanced Call Waiting functions. A separate, related software program, the Host Computer User Notification Process, is also shown in these flow charts, starting at step 900 and it also executes on computer 56.

The Host Computer Call Control Process starts at step 100. At step 100 a determination is made as to whether an incoming call has been detected by the switch 20'. Control remains in a loop at step 102 until an incoming call is detected, at which point control passes to step 104 where the computer 56 checks the ANI (Automatic Number Identification), CLID (Calling Line IDentification), and/or CPID (Calling Party IDentification) of the incoming call. The ANI tends to be a billing number, so it is not a highly reliable source for identifying a particular caller. CLID is better, since it identifies the particular telephone line which was used to originate the call. CPID is meant to identify the caller specifically. In this embodiment that caller should preferably make outbound calls via the embedded switch 20'. In that case the CLID would be associated with the particular line used by switch 20' to originate an outbound call, while the CPID would be identified with a particular caller and it preferably reflects the telephone address of the calling party irrespective of their physical location. In this entire specification, the term CPID is used to reflect an identifier associated with the person making a call. It is envisioned that the system would use whatever facilities are available to identify the calling party correctly in order to handle their calls appropriately. It is also envisioned that the user will have a feature called Hot-Line Service by which the user, when they pick up their phone, is automatically connected via their local switch 20 and the embedded switch 20' to the Enhanced Call Waiting System 40. Thus when a user picks up their telephone their CPID is checked at step 104 and the process continues on to step 108.

The CPID may be delivered to the switch via a number of different means, all generally known in the art, including Feature Group D trunks, Caller ID lines, etc. and may include a Personal Identification Number (PIN) input by the caller. If the computer 56 determines, by comparing the CPID of the call with the numbers stored in the database 55, that the call is from a phone associated with a user of the system (i.e., the user calling from home to check messages or program his service), then control passes to step 108. If the system does not recognize the CPID as belonging to a user of the system, then control passes to a flow connector labeled "Anyone Else" at step 400 via step 106.

At step 108, the system instructs the switch to connect the incoming call from the user 10 to an available port on the telephone interface 58, and then passes control to step 112, where the user 10 is provided with a dial tone or other greeting, such as "Good Morning". This and other messages may be stored in database 55, together with telephone numbers and addresses, individualized voice greetings, PIN numbers, valid CPIDs, and various control parameters which will be described. A loop formed by steps 114, 118 and 134 is entered where a determination is made at step 114 to see if a valid PIN Code has been entered by the user (prior to allowing the user to access his or her messages and programming functions). If a valid PIN Code is detected (by a prefixed * or # key, for example) then control passes to a connector labeled "Main Menu" at step 200 via step 116.

If the correct PIN Code was not entered, then control passes to step 118, where a determination is made as to whether a maximum time limit or a maximum number of PIN Code attempts has been reached. If either maximum limit is reached, then control passes to a connector labeled "Thank You" at step 120. If neither limit has been reached, then control passes to step 134 where a determination is made as to whether the user 10 input a telephone number for an outbound call. If so, control passes to step 134. If not, control returns (perhaps again) to step 114.

At connector step 120, labeled "Thank You," control immediately passes to step 122 where the user or caller is advised: "Thank you for calling . . . Good-bye." Control then passes to a connector labeled "Port Disconnect" at step 124, and then on to step 126 where computer 56 instructs the telephone interface 58 to release its port on this call. Control then passes to a connector labeled "Switch Disconnect" at step 128, and then on to step 130, where computer 56 instructs switch 20' to disconnect any remaining switch resources allocated to this call, thereby disconnecting the call. Control then passes to step 132, where control returns to the start of the Host Computer Call Control Process.

At step 136 the embedded switch 20' is instructed to seize an available outbound channel or port and to dial out to the phone number picked up at step 134. The inbound call from the user 10 is connected to the outbound channel. At step 138 the switch 20' is instructed to leave this outbound call connected (unless otherwise instructed) and to automatically disconnect this call and tear down the associated switch connections if disconnect supervision is detected on the channel.

At connector step 200, labeled "Main Menu," control immediately passes to step 202 where the user is prompted: "Hello. You have (number) messages. Touch 1 to listen to messages, 2 to change screening modes, or 3 to edit screening lists." Control then passes to a connector labeled "Main Menu Loop" at step 204, and then control immediately passes on to step 206 where a determination is made as to whether the user has touched the digit "1". If not, control passes to step 216. If "1" was entered, then control passes to step 208, where the user is provided the opportunity to listen to any of his or her voice mail messages, and save or delete them as desired. Control then passes to step 210 where a check is made to determine if the user has elected to return to the main menu. If so, then control returns to step 200. If not, then control passes to step 212, where a check is made as to whether the user is still on the line, by determining if no further commands have been entered by the user, or if disconnect supervision has been detected. If it is determined that the user is still on the line, then control returns to step 208. If the user has disconnected, or has not made any command entries within a preset interval, then control passes from step 212 to a connector labeled "Port Disconnect" at step 124 via step 214.

If, as described above, the user 10 did not touch the digit "1" at step 206, then control passes to step 216, where a determination is made as to whether the user has touched the digit "2." If not, then control passes to a connector labeled "Touch 3" at step 218. If the user did touch the digit "2," then control passes to step 220, where the user is prompted: "Touch 1 for standard screening, 2 for VIP code screening, 3 for voice screening, or 4 for caller number screening." Control then passes to step 222 where the user is provided with the opportunity to select a screening mode and store this selection as the current mode by which the Enhanced Call Waiting System will handle his or her calls. Control then passes to step 224 where a determination is made as to whether the user 10 elects to return to the main menu, and if so, control passes to a connector labeled "Main Menu" at step 200 via step 226. If the user does not elect to return to the main menu at step 224, then control passes to step 228, where a check is made as to whether the user 10 is still on the line, by determining if no further commands have been entered by the user, or if disconnect supervision has been detected. If it is determined that the user is still on the line, then control returns to step 222. If the user has disconnected, or has not made any command entries within a preset interval, then control passes from step 228 to a connector labeled "Port Disconnect" at step 124 via step 230.

At step 300, a connector labeled "Touch 3," control passes to step 302 where a determination is made as to whether the user has touched the digit "3," and if not, control passes to step 318. If the user has touched the digit "3" at step 302, then control passes to step 304 where the user is prompted: "Touch 1 to edit the VIP code screening list, or 2 to edit the caller number screening list." Control then passes to step 306, where a determination is made as to whether the user has entered the digit "1," and if not control passes to step 324. If so, then control passes to step 308 where the user is provided with the opportunity to add or delete VIP codes to his or her personal VIP code list stored in the computer 56. A plurality of VIP codes can be stored in database 55 and a different potential caller may be identified with each VIP code. As such, a different name may be stored and associated with each code, so that when a caller enters a VIP code in the processing of an incoming call, the user can be advised of the name of the person whose call is waiting to be picked up by the user. Thus, at step 308, the user is also provided with the opportunity to record a name to be associated with each VIP code in the list.

Control then passes to step 310 where a determination is made as to whether the user elects to return to the main menu, and if so, control passes to a connector labeled "Main Menu" at step 200 via step 312. If the user does not elect to return to the main menu at step 312, then control passes to step 314, where a check is made as to whether the user is still on the line, by determining if no further commands have been entered by the user, or if disconnect supervision has been detected. If it is determined that the user is still on the line, then control returns to step 308. If the user has disconnected, or has not made any command entries within a preset interval, then control passes from step 314 to a connector labeled "Port Disconnect" at step 124 via step 316.

If, as described above, the user had not touched the digit "3" at step 302, then control passes to step 318, where a check is made as to whether the user is still on the line, by determining if no further commands have been entered by the user, or if disconnect supervision has been detected. If it is determined that the user is still on the line, then control passes to a connector labeled "Main Menu Loop" at step 320. If the user has disconnected, or has not made any command entries within a preset interval, then control passes from step 318 to a connector labeled "Port Disconnect" at step 124 via step 322.

If, as described above, the user had not touched the digit "1" at step 306, then control had passed to step 324 where a determination is made as to whether the user has touched the digit "2", and if not control then passes to step 336. If so, then control passes to step 326 where the user is provided with the opportunity to add or delete entries from his or her personal list of caller phone numbers as stored by the computer 56. At step 326, the user is also provided with an opportunity to record the name of the person associated with each phone number in the list. Control then passes to step 328 where a determination is made as to whether the user elects to return to the main menu, and if so, control passes to a connector labeled "Main Menu" at step 200 via step 320. If the user does not elect to return to the main menu at step 328, then control passes to step 332, where a check is made as to whether the user is still on the line, by determining if no further commands have been entered by the user, or if disconnect supervision has been detected. If it is determined that the user is still on the line, then control returns to step 326. If the user has disconnected, or has not made any command entries within a preset interval, then control passes from step 332 to a connector labeled "Port Disconnect" at step 124 via step 334.

If, as described above, the user had not touched the digit "2" at step 324, then control had passed to step 336 where a determination is made as to whether the user elects to return to the main menu, and if so, control passes to a connector labeled "Main Menu" at step 200 via step 342. If the user does not elect to return to the main menu at step 336, then control passes to step 338, where a check is made as to whether the user is still on the line, by determining if no further commands have been entered by the user, or if disconnect supervision has been detected. If it is determined that the user is still on the line, then control returns to step 304. If the user has disconnected, or has not made any command entries within a preset interval, then control passes from step 338 to a connector labeled "Port Disconnect" at step 124 via step 340.

When control reaches the connector labeled "Anyone Else" at step 400, it has already been determined that a caller other than the user is attempting to reach the user or that the user is calling the system from a telephone which is not recognized as belonging to the user according to the data stored in database 55. Control passes from step 400 to step 402 where a determination is made as to whether anyone else is currently connected to the user via the switch. In other words, the computer 56 determines whether a caller and the user are already connected, and if that call connection is still active in switch 20'. If this is the case, then control passes to step 424 where a determination is made as to whether the user is free to accept another call. If the user already is engaged with a caller and already has a another caller on hold, then the user is not free to accept another call since this embodiment is limited to allowing the user to have only one party on hold at a given time. Also, some practicing the present invention may wish to provide a "Do Not Interrupt" function, in which case a user controlled bit would be set and tested at step 426 and the "No" branch would then be taken if either the user already had a caller on hold or if the "Do Not Interrupt" bit had been set. If the user is free to accept another caller, then control passes to a connector labeled "New Caller" at step 404. If the user is not free to accept another caller, then control passes to step 426 which advises the caller that "I'm sorry, the line is busy. Please hold the line and leave a message." and control passes via label 428 to the connector labeled "Take Message" at step 800.

If no other callers are connected to the user via the switch as tested at step 402, then control passes to step 406 where computer 56 instructs the switch to seize an available outbound channel and to dial out to the user's phone, and then connect the new caller to the user. Control then passes to step 410, where a determination is made as to whether busy or no answer is detected on the user's line, and if so control passes to a connector labeled "Take Message" at step 412. Ordinarily, you would not expect a busy response, since switch 20' should be able to report to computer 56 whether or not it has an active call with user 10. However, since the user 10 has an unpublished telephone address associated with his or her present location, it is possible, with today's technology, that a telephone call may have been made directly to the unpublished telephone address via the PSTN 30 bypassing the Enhanced Call Waiting System. In some end office switches such as the DMS-100, relationships between the lines serving the Enhanced Call Waiting System and the user's telephone such as secretarial forwarding can be enabled so that calls dialed to the unpublished number are not connected. Therefore, in the future, the telephone address will likely be a telephone number which is not directly accessible by a caller 11, but only directly accessible via switch 20', thereby avoiding that possibility.

If busy or no answer is not detected at step 410, then control passes to step 414, where a determination is made as to whether a PIN code has been entered, signifying that this is the user 10 who has called in to access his or her messages and/or to program the system from a phone which does not have CPID service or which is not recognized in database 55. For example, the user 10 may be accessing the system from a pay phone and the CPID of the pay phone would not be recognized in database 55. If a valid PIN code is detected, then control passes to a connector labeled "Main Menu" at step 416. If a valid PIN code is not detected, at step 414, then control passes to step 418 where a determination is made as to whether the call has been answered, and if not control returns to step 410. If the call has been answered, then control passes to step 420, where the computer 56 instructs switch 20' to leave this call connected unless otherwise instructed, and to disconnect this call automatically if disconnect supervision is detected on the call. Control then returns to the start of the Host Computer Call Control Process at step 100 via step 422.

When control reaches the connector labeled "New Caller" at step 500, it has already been determined that the switch has a new incoming call for a user, and that the user is already connected on an existing call to another party via embedded switch 20'. From step 500, control passes to step 502 where computer 56 instructs switch 20' to connect the new caller to an available port on the telephone interface 58. Control then passes to step 504 where a determination is made as to whether the user 10 selected caller number screening as the mode of operation, and if not control passes to step 512. If the user did select caller number screening, then control passes from step 504 to step 506 where a determination is made as to whether the CPID of the caller matches a valid caller number previously stored in the user's caller number list in database 55, and if no match is found control passes to a connector labeled "Take Message" at step 508. If a match is found, then control passes to a connector labeled "Attempt Connect" at step 510.

At step 512, database 55 is checked to determine whether the user selected VIP code screening as the mode of operation, and, if not, control passes to step 522. If the user did select VIP code screening, a parameter which is stored in database 55, then control passes from step 512 to step 514 where the caller is prompted: "I'm sorry, the line is busy. If you know your party's private code, touch it in now. Otherwise, hold the line and leave a message." Control then passes to step 516 where a determination is made as to whether the caller has entered a valid VIP code which matches a code previously stored in the user's VIP code list in database 55, and if no match is found, then control passes to a connector labeled "Take Message" at step 518. If a match is found, then control passes to a connector labeled "Attempt Connect" at step 520.

At step 522, a determination is made as to whether the user selected voice screening as the mode of operation, and if not control passes to step 530. If the user did select voice screening, then control passes from step 522 to step 524 where the caller is prompted: "I'm sorry, the line is busy. Please state your name and business at the tone, and we will attempt to connect your call." Control then passes to step 526 where the caller is given the opportunity to record his or her name and the reason for the call. Control then passes to a connector labeled "Attempt Connect" at step 528.

At step 530, it is assumed that the user must have selected standard screening mode, and therefore the user is prompted: "I'm sorry, the line is busy. Touch 0 if this call is urgent and we will interrupt your party and attempt to put your call through. Touch 1 if you would like to hold until your party is free, at which time we will connect you to your party. Or hold the line and leave a message which we will promptly attempt to deliver to your party." Control then passes to step 532, where a determination is made as to whether the caller has entered the digit "0," and if not control passes to step 538 where a determination is made as to whether the caller has entered the digit "1". If neither a digit "0" nor a digit "1" is entered within a reasonable period of time then control passes to a connector labeled "Take Message" at step 534. If the caller did touch "0" then control passes to a connector labeled "Attempt Connect" at step 536. If the caller did touch "1" then control passes to step 540 where the caller is placed on hold and music is played for them. Control passes to step 542 where a determination is made as to whether the caller is still connected on another call. Since all calls, both outgoing by the user and incoming to the user, are preferably conveyed via embedded switch 20', this information is readily available to the Enhanced Call Waiting System 40. When the user hangs up, then control passes to the connector labeled "Outbound" at 424 via step 548, provided that the new caller is still waiting, as that is detected at step 544. If they are still waiting, the process loops at step 542 and 544, waiting for the user to hang up. If the new caller hangs up, then the associated port disconnects at steps 124 and 126 via step 546.

A nice modification of the foregoing would be to provide a test at step 510 (instead of transferring directly to "Attempt Connect") to determine which of several categories that the new caller's CLID or CPID falls into. For example, the user may have set up several categories of callers and the manner in which the Enhanced Call Waiting System will handle the callers' calls will depend on the category in which they fall (as defined by their CLIDs or CPIDs). After the test is made, then the new call could be transferred to steps 514, 524, 530 or directly to "Attempt Connect" at step 600 as a function of the category into which the new caller falls. Of course, some callers are directly transferred to "Take Message" via step 508 as a function of their CLID as initially tested at step 506.

When control reaches the connector labeled "Attempt Connect" at step 600, it has been determined that switch 20' has a new incoming call for the user, and that the user is already connected on an existing call to another caller via the switch. It has also already been determined that the new caller has passed a screening criteria as established by the particular mode of operation pre-selected by the user. Control then passes from step 600 to step 602, where telephone interface 58 is instructed to play hold music to the new caller. Control then passes to step 603 where a test is made to determine whether the user is still engaged in a telephone connection with the existing caller. In the event the user terminated the original call by the time step 603 is reached, then the processing branches to connect the new caller directly to the user via the connector labeled "Outbound" to step 406 (FIG. 4D) via step 424. If the user is still engaged, the processing proceeds to step 604 where the computer 56 instructs switch 20' to disconnect the original caller to user connection in the switch. Control then passes to step 606 where computer 56 instructs the switch to park the original caller and then control passes to step 608 where computer 56 instructs the switch to connect the user to an available port on the telephone interface 58. Control then passes to step 610 where a determination is made as to whether the mode of operation is caller number screening or VIP code screening, and if not, then control passes to step 618. If the mode was caller number or VIP code screening, then control passes to step 612 where the computer 56 retrieves the recorded name associated with this number of code. Control then passes to step 614 where the user is prompted: "BEEP . . . We have a call holding for you from (name)." Control then passes to a connector labeled "Reconnect" at step 616.

At step 618 a determination is made as to whether voice screening is the selected mode, and if not control passes to step 626. If voice screening is the selected mode, then control passes from step 618 to step 620 where the computer 56 retrieves the recorded name and business as just recorded by the caller. Control then passes to step 622 where the user is prompted: "BEEP . . . We have a call holding for you from (name and business)." Control then passes to a connector labeled "Reconnect" at step 624.

At step 626, since the mode has been determined not to be voice screen, VIP code screening, or caller number screening, it is assumed that the mode is standard screening, and the user is simply prompted: "BEEP . . . we have a call holding for you." Control then passes to a connector labeled "Reconnect" at step 628, and then to step 630 where the computer 56 instructs the switch to reconnect the original caller to user connection. Control then passes to a connector labeled "Wait for User" at step 632.

In steps 604–630 above, the another-party-to-user connection was interrupted temporarily in order to allow the user to be informed that a new caller was holding. Note that, using the embedded switch, this can be accomplished either by completely interrupting the existing call by parking the existing caller (the 'another party') as described above, or alternatively by only partially interrupting the call by creating a conference connection so that the user hears both the prompt regarding the new caller, and the continuing conversation from the existing caller. In this option, the conference would be constructed so as to allow the existing caller to continue to hear audio from the user, but not to hear the prompt concerning the new caller. In this description, the original connection is made between the user and another party. Sometimes the 'another party' is referred to as the 'existing caller,' depending on the context. Those skilled in the art will appreciate that the present system handles the new caller's call independently of how the original another-party-to-user connection was formed (i.e., either the user or the another party could have initiated the another-party-to-user connection).

When control reaches the connector labeled "Wait for User" at step 700, it has already been determined that the switch has a new incoming call for a user, and that the user is already connected on an existing call to another caller via the switch. It has also already been determined that the new caller has passed a screening criteria as established by the mode of operation preselected by the user. Further the system has notified the user that the new caller is holding. From step 700, control passes to step 702 where a loop is entered consisting of steps 702, 706, and 710. If it is determined at step 702 that the new caller has elected not to wait, and instead chooses simply to leave a message, then control passes to a connector labeled "Take Message" at step 704. This can be done, for example, by having the caller enter a digit if they wish to leave a message instead of waiting for the user. Recall that, as provided at step 602, music is being played to the incoming caller. This music can be interrupted with a message such as "Touch X to leave a message." Thus step 702 may detect the presence of a DTMF sound corresponding to the depression of the particular key (X) mentioned in the message.

If it is determined at step 706 that the new caller has hung up instead of waiting to be connected or leaving a message, then control passes to a connector labeled "Port Disconnect" at step 124 via step 708. If it is determined at step 710 that the user has touched the digits "##" to connect to the waiting party, control passes on to step 714. Note that switch 20' preferably has the ability to detect DTMF tones on these lines and that the preferred switch has such capabilities. Otherwise some other signal method must be selected, such as a flash hook. The loop of steps 702, 706, and 710 persists until one of these conditions is met. The loop preferably includes a test, which is made at step 711, to determine whether the user has terminated the other party with the original caller. If so, the processing immediately branches via the connector labeled "Outbound" to step 406.

A connector labeled "Park" is encountered at step 712, and control passes to step 714 where computer 56 instructs switch 20' to disconnect the then existing caller and user connection, place information regarding the existing caller in a Held Caller Data Stack and place the existing caller on hold. Control then passes to step 716 where the telephone interface is instructed to play hold music for the caller who was just placed on hold. Control passes via connector 718 labeled "Connect Caller" to step 720 where a determination is made as to whether the user touched "##" to be connected to a new caller or to be connected to the oldest caller in the Held Caller Data Stack. The first time through this loop the user is trying to connect to a new caller and therefore the "yes" branch is taken to step 722 where switch 20' is instructed to connect the user to the new caller. As will be seen, the program loops, allowing the user to alternate between at least two callers, i.e., the present caller with whom the user is speaking and the held caller, who is hearing music. Moreover, more than one caller can be placed on hold, allowing the user to rotate through a plurality of callers. The information regarding the held callers is placed in the Held Caller Data Stack and, as will be seen, when a caller is retrieved from the stack, it is preferably the oldest caller first.

The first time through the loop the original caller is put on hold at step 716 and the new caller becomes the present caller. Control passes from step 722 to step 740 where a determination is made as to whether the user touched the digits "##" again, and, if so, control passes back to the connector labeled "Park" at step 712 via step 762, assuming that a held caller is still available (i.e., they have not hung up their phone(s)) as tested at step 742. Step 742 would typically poll the various held connections to determine whether the parties are still holding and, if not, update the Held Caller Data Stack to reflect any disconnections and tear down any switch connections which might be needed. If the user fails to touch "##" again or if they do and a held caller is no longer available, then control passes to step 744 where a determination is made as to whether a disconnect caused by the present caller hanging up is detected in the user-to-present-caller connection. If the present caller has not disconnected, then control passes to step 746 where a determination is made as to whether the user disconnected and, if so, then all held callers are advised of this fact by a prompt at step 748 advising them "(Name—from database 55) has disconnected. Thank you for calling" and then the held callers are disconnected at step 750. Step 750 also tears down the associated switch connections and empties the Held Caller Data Stack for the user. Control passes to a connector labeled "Switch Disconnect" at step 124 via step 760. If a disconnect is not detected at step 746, then control returns to step 720 so the system loops at steps 740, 744 and 746 looking for either a command (the ## keys) from the user or for the present caller to hang up while the user has an open voice channel with the present caller or for the user to hang up.

If the present caller disconnects (i.e., hangs up), that is detected at step 744 and then the user is reconnected via step 752 with the longest held caller (assuming that more than one caller has been placed on hold—if only one caller has been placed on hold then the user is connected to that held caller as that caller is the longest held caller by definition). A test is made at step 752 to determine whether there are any remaining held callers in the Held Caller Data Stack. If the stack is empty, the user is disconnected via step 760. Assuming that one or more held callers are still available, the user is advised by a courtesy message at step 754 "You have N remaining parties on hold. Touch ## to connect to them". "N" in the prompt indicates the number of parties still on hold. If the user touches "##", that is detected at step 756, and control passes to step 718 via step 764. If the user hangs up, that is detected at step 758, and control passes back to step 748. The program loops at steps 756 and 758 looking for either a "##" or a disconnect from the user. If the user touches "##", then control passes to step 718 and then on to step 720 where the aforedescribed test is encountered. This time the "No" branch is taken since the user is being reconnected with a held caller. If a new caller calls while the user has a party on hold, for example, then after the user touches "##" the "Yes" branch is taken at step 720. If no new caller has called when the user touches "##" then the "No" branch is taken instead. When the "No" branch at step 720 is taken, first the oldest caller is retrieved from the Held Caller Data Stack at step 724 and control passes to step 726 where a determination is made as to whether the system has stored information regarding the identity of the retrieved party. For example, if caller number screening, VIP screening or voice screening were used in screening the caller, then the system has at least that information available. If the system can collect the party's ANI or CLID or preferably the party's CPID, then that information is available. In any event, if information regarding the identity of the retrieved caller is available, then control passes to step 728 where that information is retrieved and then on to step 730 where the user is prompted "You are being connected to (name)." This prompt would preferably be changed to suit the type of identification information available. Control then passes to step 734 where switch 20' is instructed to connect the user to the retrieved caller. If no identification information is available, then the user may be simply prompted "Connecting" at step 732 before control passes to step 734. After step 734 control passes to step 740, which has already been described.

When control reaches the connector labeled "Take Message" at step 800, control immediately passes to step 802 where the caller is prompted: "Please leave your message at the tone." Control then passes to step 804 where the caller is provided with an opportunity to record and store a message to the user. Control then returns to the start of the Host Computer Call Control Process at step 100 via step 806.

II. Host Computer User Notification Process

Step 900 represents the start of the Host Computer User Notification Process, which is a software program which also executes on computer 56. This process is intended to notify the user whenever a caller has unsuccessfully attempted to reach the user, whether or not a voice mail message was left.

Control passes from step 900 to step 902, where a determination is made as to whether the user 10 has indicated that he or she desires to be notified of unsuccessful call attempt, and if not control returns to step 902. If the user does desire to be notified, then control passes to step 904 where a determination is made as to whether any calls are currently connected via the switch to the user, and if so, the notification is held off, by returning control to step 902. If no callers are currenty connected to the user, then control passes to step 906 where computer 56 instructs the switch to seize an outbound trunk and dial out to the user's phone. Control then passes to step 908 where a determination is made as to whether busy or no answer has been detected, and if so control passes to a connector labeled "Disconnect" at step 910, then to step 912 where computer 56 instructs the switch to disconnect this call, and then back to the loop at step 902. If at step 908, busy or no answer was not detected, then control passes to step 914, where a determination is made if the call has been answered, and if not control returns to step 914. If the call is answered, then control passes to step 916 where the computer 56 instructs the switch to connect an available port on the phone interface to this call. Control then passes to step 918 where a determination is made if the user is required to enter a PIN code, and if not control passes to step 920. If a PIN code is required, then control passes to step 932 where the user is prompted: "Please enter your code." Control then passes to step 934 where a determination is made if a valid PIN code is entered, and if so control passes to step 920. If not, control passes to step 936 where a determination is made if a maximum time limit or maximum number of PIN code attempts has been made, and if so control passes to a connector labeled "Disconnect" at step 910 via step 938. If the maximum conditions have not been met at step 936, then control returns to step 934.

At step 920 a determination is made if any messages are available for the user, and if so control passes to the connector labeled "Main Menu" at step 200 via step 922. If not, control passes to step 924 where a determination is made as to whether a caller has recently unsuccessfully attempted to reach the user, and did not leave a message. If not, control passes to a connector labeled "Disconnect" at step 926. If so, the user is prompted: "You had a call ('from NAME' if available) while you were on the line, however they did not leave a message." Control then passes to a connector labeled "Main Menu" at step 200 via step 930.

Other Embodiments

With the implementation of many new intelligent network capabilities such as Signaling System 7 (SS7), Integrated Services Digital Network (ISDN), and Advanced Intelligent Network (AIN) there may emerge a multiplicity of ways in which to implement the Enhanced Call Waiting System with particular network switching, database, routing, and signaling capabilities. The previous system descriptions of implementations are only intended to show two possible embodiments of the invention. The invention is not restricted to these embodiments or implementations but may end up being realized in a variety of forms especially as these new capabilities become available in the telecommunications network. In fact, there may be new network capabilities that have not yet been disclosed which would facilitate the implementation of the Enhanced Call Waiting System disclosed herein.

Having described the invention in connection with certain embodiments thereof, modification will now suggest itself to those skilled in the art. For example, the voice prompts set forth in the specification are only exemplary. They will very likely be changed by those desiring to practice the instant invention. In the above description of the invention, the connection of callers to the user was accomplished with a "switch". The connection of callers and the user by means of a "switch" was described for illustrative purposes only and does not imply that it is the exclusive method of connection. The switch is not limited to a network switch, but also includes other equivalent mechanisms to connect parties together. Such mechanisms include, but are not limited to, time slot interchanges, conference bridges, circuit selectors, digital cross connect systems, bridges, and routes. For this and other reasons, the invention is not to be limited to the embodiments described herein, except as required in the appended claims.

We claim:

1. A method of providing telecommunication services to a user when the user is engaged in a first telephone call with a first party over a voice channel while a second party attempts to place a second telephone call to the user, the method comprising the steps of:
   (a) after the second party places the second telephone call, receiving identification information relating to the second party; and
   (b) transmitting the received identification information to the user via said voice channel while the user remains engaged with the first telephone call so that the user hears at least the received identification information while the first party continues to hear the user, but without transmitting the received identification information to the first party over said voice channel.

2. The method of claim 1 wherein the user continues to receive audio emissions of the first party while hearing the received identification information.

3. The method of claim 2 further including:
   (c) detecting whether or not the user inputs a command, and in response to the detection of said command, coupling the second telephone call from the second party with the user.

4. The method of claim 3 further wherein when a third party attempts to place a third telephone call to the user when said user is actively engaged with either said first or second party, steps (a), (b) and (c) are then performed in connection with said third party rather than said second party.

5. The method of claim 3 further including, in response to a lack of detection of said command, coupling the call from the second party to a message center.

6. The method of claim 3 wherein said first party is placed on hold in response to the detection of said command and further including detecting whether the user subsequently inputs said command to toggle or loop among parties then on hold, and further including transmitting available identification for a party immediately prior to connecting the user to such party in response to subsequent inputs of said command.

7. The method of claim 1 wherein the second party is prompted to provide identification information which then is transmitted to the user as said received identification information.

8. The method of claim 7 wherein the identification information provided by the second party is an audible response.

9. The method of claim 1 wherein step (b) is selectively performed based upon previously stored selection criteria.

10. The method of claim 1 wherein step the identification information received in step (a) is received in a different format than which it is transmitted in step (b).

11. An apparatus for providing communication services to a user, said apparatus comprising:
   (a) a switch for coupling the user in a first telephone call with a first party via an audio path; and
   (b) a programmed call processor coupled to said switch and responsive to a second party attempting to place a second telephone call to the user when the user is already engaged in said first telephone call, said call processor being programmed to:
      (i) receive identification information relating to the second party;
      (ii) transmit the received identification information to the user via the audio path of the first telephone call, without directly transmitting the received caller identification information to the first party and without muting the first party from the audio path to the user.

12. The apparatus of claim 11 wherein said call processor is programmed to allow the user to continue to receive audio emissions of the first party while hearing the received identification information.

13. The apparatus of claim 12 wherein said call processor is further programmed to:
   (iii) detect whether or not the user inputs a complete connection command; and
   (iv) instruct said switch to place the second party in telephone communication with the user upon receiving said complete connection command from the user.

14. The apparatus of claim 13 wherein said call processor is further programmed to:

(v) place said first party on hold in response to the detection of said command;

(vi) detect whether the user subsequently inputs said command one or more times to toggle or loop among parties then on hold;

(vii) transmit available identification for a party immediately prior to connecting the user to such party in response to subsequent inputs of said command.

15. The apparatus of claim 13 wherein said call processor is further programmed to instruct said switch to couple said second telephone call to a voice mail facility if said complete connection command is not received within a period of time.

16. The apparatus of claim 11 wherein the call processor is programmed to prompt the second party to identify himself or herself and to transmit any response provided by the second party to the user as said received identification information.

17. The apparatus of claim 16 wherein the response provided by the second party is an audible response and wherein said call processor is programmed to transmit the audible response to the user as said received identification information.

18. The apparatus of claim 11 wherein said caller processor is programmed to advise the user that there is a call waiting only if the received identification information meets certain previously stored selection criteria.

19. The apparatus of claim 11 wherein said call processor is further programmed to receive the identification information in a first format and transmit it in a different format.

20. A method of controlling a telephone call to a user of a telecommunications system, comprising the steps of:

storing in a database one or more incoming call identifiers associated with a person making an incoming call, and one or more incoming call screening control options from a group including: standard call screening, special person screening, which uses a special person screening private code, voice screening, and caller number screening, detecting an incoming call from a party, determining if the user is engaged in a telephone call with another party, and upon determining that the user is so engaged:

determining the incoming call screening control option selected and comparing an incoming call identifier for the incoming call with the incoming call identifiers for the incoming call screening control option selected, and if the comparing does not provide a comparing match, informing the party making the incoming call to leave a message, and if the comparing does provide a comparing match and the incoming call screening control option is standard call screening, attempting a connection by the party making the incoming call with the user, and if the comparing does provide a comparing match and the incoming call screening control option is the special person screening, requesting the party making the incoming call to provide the special person code screening private code and, if a special person screening private code provides a private code match, attempting a connection by the party making the incoming call with the user, and if the comparing does provide a comparing match and the incoming call screening control option is voice screening, requesting the party making the incoming call to provide a voice statement, recording the voice statement, and attempting a connection by the party making the incoming call with the user, such that when attempting a connection by the party making the incoming call with the user a determination is made as to whether the user remains engaged with another party, and, if the user is disengaged, connecting the party making the incoming call with the user, and, if the user is engaged with another party:

if the determining of the incoming call screening option provides either caller number screening or special person screening, retrieving the caller name provided for the party making the incoming call, providing a message to the user identifying the caller name of the party making the incoming call, and if the determining of the incoming call screening option provides for voice screening, retrieving the voice statement, providing the voice statement to the user, and sensing a command entered by the user to connect to the party making the incoming call, and upon sensing said command, disconnecting the user's telephone call the another party and connecting the party making the incoming call with the user.

21. The method of claim 20 wherein the step of detecting an incoming call includes providing the user with a user notification processing option for providing a notification to the user that an incoming call was attempted but not connected to the user.

22. The method of claim 20 wherein the step of detecting an incoming call includes providing the user with a message processing option for listening to, deleting or saving messages.

23. The method of claim 20 wherein the step of attempting a connection by the party making the incoming call with the user includes the step of providing the party making the incoming call with an option of leaving a message for the user.

24. An apparatus for controlling a telephone call to a user at a user's telephone, said apparatus comprising:

a database for storing one or more incoming call identifiers associated with a person making an incoming call and one or more incoming call screening control options from a group including: standard call screening, special person screening, including a special person screening private code, voice screening, and caller number screening;

a switch, coupled to the database, for coupling telephone calls to the user's telephone from one or more incoming callers; and a call processing facility, coupled to the database and switch, including:

means for detecting an incoming call to the switch and determining from information stored in the database the incoming call identifier associated with a caller making the incoming call, computing means coupled to the means for detecting for determining if the user's telephone is engaged, and upon determining that the user's telephone is engaged:

determining the incoming call screening control option stored in the database and comparing the incoming call identifier for the party making the incoming call with the incoming call identifiers for the incoming call screening control option selected, and if the comparing does not provide a comparing match, informing the party making the incoming call to leave a message, and if the comparing does provide a comparing match and the incoming call screening control option is standard call screening, attempting a connection of the incoming call with the user's telephone, and if the comparing does provide a comparing match and the incoming call screening control option is the special person screening, requesting the party making the incoming call to provide the special person code screening private code and, if the special person screening private code provides a private code match, attempting a connection of the incoming call with the user's telephone, and if the comparing does provide a comparing match and the incoming call screening control option is voice screening, requesting the first-non user to provide a voice statement, recording the voice statement, and attempting a connection of the incoming call with the user's telephone, such that when attempting a connection of the incoming call with the user a determination is made as to whether the user's telephone is engaged, and, if the user's telephone is disengaged, connecting the incoming call with the user's telephone, and, if the user's telephone is engaged with another party:

if the determining of the incoming call screening option provides either caller number screening or special person screening, retrieving the caller name provided for the party making the incoming call, providing a message to the user identifying the caller name of the party making the incoming call and if the determining of the incoming call screening option provides for voice screening, retrieving the voice statement, sending the voice statement to the user's telephone, and sensing a command entered by the user to connect to the party making the incoming call, and upon sensing said command, causing said switch to connect the user's telephone with the incoming call.

25. The apparatus of claim 24 wherein the computer means includes means for providing the user with a user notification processing option for notifying the user that an incoming call was attempted but not connected to the user.

26. The apparatus of claim 24 wherein the computer means includes means for providing the user with a message processing option for listening to, deleting or saving messages.

27. The apparatus of claim 24 wherein the computer means includes means for providing the user with a non-user notification option to allow a caller who is attempting to connect with the user to have an option of leaving a message for the user.

* * * * *